United States Patent [19]

Nakamura et al.

[11] Patent Number: 5,485,287
[45] Date of Patent: Jan. 16, 1996

[54] HIGH-SPEED IMAGE SIGNAL PROCESSING SYSTEM

[75] Inventors: Kozo Nakamura, Hitachiota; Yasushi Yokosuka, Nakaminato; Yasuyuki Kozima, Yokohama; Kazuhiko Takaoka, Yokohama; Kagehiro Yamamoto, Yokohama; Takeshi Asai, Hitachi, all of Japan

[73] Assignees: Hitachi, Ltd., Tokyo; Hitachi Engineering Co., Ltd., Ibaraki, both of Japan

[21] Appl. No.: 900,476

[22] Filed: Jun. 18, 1992

[30] Foreign Application Priority Data

Jun. 18, 1991 [JP] Japan ................................. 3-171899
Sep. 25, 1991 [JP] Japan ................................. 3-271915

[51] Int. Cl.[6] ........................... H04N 1/41; H04N 1/21
[52] U.S. Cl. ........................ 358/426; 358/444; 358/468
[58] Field of Search ............................. 358/401, 448, 358/443, 426, 432, 444, 468; 382/41, 44, 49

[56] References Cited

U.S. PATENT DOCUMENTS 4,545,068  2/1983  Tabata ................................. 382/41
4,807,020  7/1984  Hirosawa ............................. 358/75

Primary Examiner—Sandra L. O'Shea
Assistant Examiner—John Ning
Attorney, Agent, or Firm—Antonelli, Terry, Stout & Kraus

[57] ABSTRACT

A high-speed image signal processing system for encoding an image signal, read out at a high speed, into an encoded signal, and/or for recording a decoded signal obtained through a decoding operation on an encoded signal. The image signal, obtained through a scanning operation on an original document, is sent to an encoder through an image bus. A code bus, provided at an output of the encoder, is connected with an encoded-signal memory for storing the encoded signal. A code transfer unit, for performing input/output operation over the encoded signal and for performing transfer of the encoded signal from the code bus to a system bus, is disposed between the code bus and the system bus. A control unit, performing control over the entire system, and a document management data memory, storing management data for performing management over documents stored in the encoded-signal memory, are connected to the system bus. Further, the control unit, when receiving a request from a data input/output unit, issues a command indicative of the start of the encoding/decoding operation to the encoder/decoder. The encoder/decoder, when receiving the command from the control unit, sequentially processes the data from the data input/output unit without any intervention of the control unit, and when the data processing is completed, informs the control unit of the end of the data processing.

15 Claims, 19 Drawing Sheets

FIG. 3

- 1101 COMMAND (INPUT)
- 1102 HEADING ADDRESS IN MEMORY 70 FOR THE PAGE (INPUT)
- 1103 LAST ADDRESS IN MEMORY 70 FOR THE PAGE (OUTPUT)
- 1104 BYTE NUMBER (INPUT)

FIG. 4

| | | | |
|---|---|---|---|
| FIRST DOCUMENT LABEL | DOCUMENT DATA | TOTAL PAGE NUMBER | 801 |
| FIRST PAGE BYTE NUMBER | HEADING ADDRESS IN MEMORY 70 FOR FIRST PAGE | | 802 |
| SECOND PAGE BYTE NUMBER | HEADING ADDRESS IN MEMORY 70 FOR SECOND PAGE | | 802 |
| THIRD PAGE BYTE NUMBER | HEADING ADDRESS IN MEMORY 70 FOR THIRD PAGE | | 802 |
| SECOND DOCUMENT LABEL | DOCUMENT DATA | TOTAL PAGE NUMBER | |
| FIRST PAGE BYTE NUMBER | HEADING ADDRESS IN MEMORY 70 FOR FIRST PAGE | | |

(800)

HIGH-SPEED IMAGE SIGNAL PROCESSING SYSTEM

BACKGROUND OF THE INVENTION

The present invention generally relates to image signal processing systems for encoding an image signal into an encoded signal and/or for decoding the encoded signal at a high speed into the original image signal, and, more particularly, to a high-speed image signal processing system which can be suitably applied to a facsimile apparatus to encode a bit map image signal for use in the facsimile apparatus into an encoded signal at a high speed and/or to decode the encoded signal into the original image signal.

As a prior art image signal processing systems for encoding an image signal into an encoded signal and/or for decoding the encoded signal at a high speed into the original image signal, several types of systems which follow are known.

In first one of the types of the prior art systems as disclosed, for example, in JP-A-49-126368, in a signal transmission mode, an image signal obtained from a reader is converted at a high-quality converter into a binary image signal by a scanning image processor and then temporarily stored in a bit map page memory connected directly to an image bus. Next, the binary image signal stored in the bit map page memory is encoded at an encoder/decoder unit connected directly to a system bus into an encoded signal, and the encoded signal is then stored in an encoded-document memory connected directly to the system bus. Subsequently the encoded signal stored in the encoded-document memory is, as necessary, transmitted through a communication unit connected directly to the system bus.

In a signal reception mode, on the other hand, an encoded signal received at the communication unit is temporarily stored in the encoded-document memory through the system bus. The encoded signal temporarily stored in the encoded-document memory is then decoded at the encoder/decoder unit through the system bus into a binary image signal and stored in the bit map page memory through the image bus. Next, the binary image signal stored in the bit map page memory is converted into an image signal by a recording signal processor connected directly to the image bus to be recorded at a recorder.

The second type of prior art system is disclosed in, for example, an article entitled "ASIC Introduction in Ultra-high Speed Facsimile Apparatus" in a magazine ELECTRONIC TECHNIQUES, 1988, April, pp. 64–72.

This literature is different from the above invention of JP-A-59-126368 in that, in this literature, the encoder/decoder unit of the above invention is separated into an encoder and a decoder and the bit map page memory is removed.

The operation of the second type of system is substantially the same as that of the above first type of system, except that the binary image signal is sent from the scanning signal processor directly to the encoder to be encoded thereat and that the binary image signal decoded at the decoder is sent directly to the recording signal processor.

A third type of prior art system is disclosed, for example, in JP-A-57-57084, in which a facsimile apparatus employing a constant-speed recorder (such as a laser printer), a bit map page memory is provided for storing therein a bit map document image signal obtained through the decoding operation of a received encoded signal, the memory being required to have a storage capacity of one or more pages.

in the first type system, it is necessary, in the transmission and reception modes, to transfer the same binary image signal twice through the image bus and to transfer the same encoded signal twice through the system bus during one-page processing operation. Thus, when it is desired to carry out the transmitting and receiving operations at the same time, the same signal must be transferred four times through each of the image and system buses. For this reason, in order to realize a higher-speed and higher-function system, this disadvantageously involves the need for such a bus that can be operated at a higher speed. Further, the first type system has another problem in that the bit map page memory must have such a large capacity as to be able to store pixels corresponding to one or more document pages, and since the bit map page memory comprises a semiconductor memory for its high speed operation, the cost of the entire system is unfavorably made high.

Meanwhile, the second type system has a problem that it is necessary, even in the transmission and reception modes, to transfer the same encoded signal twice through the system bus during one-page processing operation. Thus, like the first type system, such a system bus as to be-able to be operated at a higher speed becomes necessary.

In the second type system, further, since the encoding and decoding operations are carried out directly without any intervention of any bit map page memory, it becomes necessary to transfer the encoded signal from the encoder to the encoded-document memory through the system bus in conformity with the reading rate or to transfer the encoded signal from the encoded-document memory to the decoder through the system bus in conformity with the recording rate. In this way, this system is disadvantageous in that the load on the system bus due to the transfer of the encoded signal becomes high and thus it is difficult to make high the reading and recording speeds.

The third type system has a problem that the bit map page memory must have a large capacity.

In facsimile techniques, in order to improve an image-data transmission efficiency, image data transmission is carried out on such a Modified Huffman (MH), modified READ (MR) or modified MR (MMR) coding basis as recommended by Comité Consultatif International Télégraphique et Téléphonique (CCITT). In this coding, the image data is transmitted in the form of codes to which white-black transition points in the image data are converted, that is, when the code conversion is carried out for the same data bit number and the number of white-black transition points per unit length of the data is relatively large, the amount of processing of the data is correspondingly increased, which results in the data encoding rate also being decreased. The same hold true when it is desired to decode the encoded data. That is, when decoding is carried out for the same code bit number and the number of white-black transition points per unit length of the original data is relatively large, the number of bits in the data to be decoded is decreased.

To eliminate the above problem, there have been recently developed facsimile apparatuses which, even when it is desired to process such data having many white-black transition points as mentioned above, can perform its encoding and decoding operations at a high speed. One example of such facsimile apparatuses is disclosed in JP-A-60-194670 or JP-A-62-35780.

However, when this entire facsimile system including the encoding/decoding means is observed, a control unit, a memory means, a reader means, a recorder means, an encoder means and a decoder means in the system are operated as closely associated with each other. Accordingly, it is clear that, without consideration of transfer of control signals between these peripheral devices and the load state of a data bus, it is impossible to form an efficient facsimile system.

This type of facsimile system is disclosed, as an example, in a magazine ELECTRONIC TECHNIQUES, 1988, April, pp. 64–72 and in the same magazine, 1990, August, pp. 67–71. In this facsimile system, no reference is made to how to increase the efficiency of the encoding/decoding means.

In the high-speed encoding and decoding means of the aforementioned literature there is disclosed making the facsimile system in the form of a gate array to reduce the number of necessary parts. Thus, no consideration is paid to how to improve the method of transferring the control signals among the encoder means, control unit and reader means and the method for transferring the control signals among the decoder means, control unit and recorder means to provide high-speed processing with use of a smaller number of necessary parts in the entire facsimile system.

For this reason, in the case where the aforementioned high-speed encoder/decoder means are built in the facsimile system, the control load of the control unit over the encoder/decoder means becomes too high. Accordingly, without employing a processor having a high processing ability as the control unit or without adding a means for increasing the number of processors, the system cannot fully exhibit the high-speed processing performance of the encoder/decoder means. In this case, in addition, when it is desired to improve the user application service of the entire facsimile system with use of a prior art type of processor, the processing load of the control unit becomes too high and thus satisfactory service cannot be attained.

Further, even in the aforementioned facsimile apparatuses, since the control unit controls the operation start and end timing of respective parts, when it is desired to increase the data processing rate of the encoder/decoder means, this also involves excessively increasing the processing load of the control unit, whereby a satisfactory data processing rate cannot be attained.

For the purpose of increasing the data processing rate of the encoder/decoder means and improving the user application service, it has been proposed to employ a processor having a high processing ability or to increase the number of processors. However, this also undesirably involves an increase in the cost corresponding to the increased number or processors.

SUMMARY OF THE INVENTION

It is therefore a major object of the present invention to provide a high-speed image signal processing system which encodes an image signal obtained through a reading operation of an original document into an encoded signal and/or records the image signal obtained through a decoding operation of the encoded signal at a high speed without using any bit map page memory.

Another object of the present invention is to provide an image signal processing system which can perform encoding and decoding operations with a high throughput even when the encoding/decoding operation is controlled with use of a control processor having a relatively low performance.

In accordance with a first aspect of the present invention, the above major object is attained by providing a high-speed image signal processing system in which an image signal obtained through the scanning operation of an original document is sent through an image bus to an encoder means to be converted into an encoded signal thereat and the obtained encoded signal is sent onto a system bus; and wherein a code bus is provided at an output side of the encoder means, an encoded-document memory means for temporarily storing the encoded signal as an output of the encoder means is connected to the code bus, a code transfer means for inputting and outputting the encoded signal to the encoded-document memory means and also for transferring the encoded signal of the code bus to the system bus is disposed between the code bus and the system bus, and a control means for performing general control over the entire system and a document management data memory means for storing document management data for management of the document stored in the encoded-document memory means are connected to the system bus.

In accordance with a second aspect of the present invention, the above major object is attained by providing a high-speed image signal processing system in which an encoded signal is sent through a system bus to a decoder means to be converted into a decoded image signal thereat and the obtained image signal is sent through an image bus to a recorder means; and wherein a code bus is provided at an input side of the decoder means, an encoded-document memory means for temporarily storing the encoded signal is connected to the code bus, a code transfer means for inputting and outputting the encoded signal to the encoded-document memory means and also for transferring the encoded signal of the system bus to the code bus is disposed between the system bus and the code bus, and a control means for performing general control over the entire system and a document management data memory means for storing document management data for management of the document stored in the encoded-document memory means are connected to the system bus.

In accordance with a third aspect of the present invention, the above major object is maintained by providing a high-speed image signal processing system in which an image signal obtained through the scanning operation of an original document is sent through an image bus to an encoder means to be converted into an encoded signal thereat, the obtained encoded signal is sent onto a system bus, the encoded signal is sent through the system bus to a decoder means to be converted into a decoded image signal thereat and the obtained image signal is sent through the image bus to a recorder means; and wherein a common code bus is provided at an output side of the encoder means and at an input side of the decoder means, an encoded-document memory means for temporarily storing the encoded signal is connected to the code bus, a code transfer means for inputting and outputting the encoded signal to the encoded-document memory means and also for transferring the encoded signal of the code bus to the system bus or for transferring the encoded signal of the system bus to the code bus is disposed between the code bus and the system bus, and a control means for performing general control over the entire system and a document management data memory means for storing document management data for management of the document stored in the encoded-document memory means are connected to the system bus.

In the first aspect of the present invention, the encoder means performs its encoding operation over the read image signal at a high speed on a real time basis in conformity with the scanning read rate of the document to generate an encoded signal, and outputs the encoded signal onto the code bus. The code transfer means transfers the encoded signal issued from the encoder means to the encoded-document memory means at a high speed on a real time basis to be temporarily stored therein. The code transfer means further reads out the encoded signal temporarily stored in the encoded-document memory means and transfers the read-out encoded signal from the code bus to the system bus. The encoded signal sent to the system bus is then sent to the communication line through the communication means connected to the system bus, or sent to a filing means connected to the system bus to be filed in the filing means. These operations are executed under the control means connected to the system bus.

In the second aspect of the present invention, the encoded signal received at the communication means or the encoded signal from the filing means is output onto the system bus. The code transfer means transfers the encoded signal from the system bus to the code bus, and stores the encoded signal in the encoded-document memory means. The code transfer means reads out the encoded signal stored in the encoded-document memory means in accordance with the rate requested by the decoder means and transfers the read-out encoded signal through code bus to the decoder means. The decoder means decodes the encoded signal into the image signal in accordance with the rate requested by the recorder means or display means, outputs the image signal to the recorder means and as necessary, outputs it to the display means. These operations are executed under the control means connected to the system bus.

In the third aspect of the present invention, the high-speed encoding operation is carried out concurrently with the high-speed decoding operation.

In order to attain other objects of the present invention, in accordance with the first aspect of the present invention, there is provided a high-speed image signal processing system which comprises at least a data input/output means an encoder/decoder means and a control unit for performing general control over the entire image processing, and in which the control unit, when receiving a request from the data input/output means, issues to the encoder/decoder means a command to start its encoding/decoding operation, and the encoder/decoder means, when receiving the command, sequentially executes its data processing operation on the basis of data regarding a shift in the data received from the data input/output means in its sub-scanning direction without any intervention of the control unit and informs the control unit of the end of the data processing.

In accordance with the second aspect of the present invention, the other objects can be attained by providing a high-speed image signal processing system which comprises at least a reader means for reading an original document, an encoder means for encoding data read out by the reader means and a control unit for performing general control over image processing, and in which the control unit, when receiving a document read request from the reader means, sets an encoding mode and sends an encoding command to the encoder means and thereafter, the encoder means, when receiving a read start request from the reader means, performs its encoding operation without any intervention of the control unit and when receiving a page end request from the reader means, terminates its encoding operation without any intervention of the control unit and sends an encoding end signal to the control unit, and the control unit sends the encoding end command to the reader means for its encoding operation.

In accordance with the third aspect of the present invention, the other objects can be attained by providing a high-speed image signal processing system which comprises at least a decoder means for decoding encoded data received from a receiver means or an encoded-data memory means, a recorder means for recording data decoded at the decoder means and a control unit for performing general control over image processing, and in which the control unit, when receiving a document read request from the receiver means or the encoded-data memory means, sets an encode/record mode and sends a decoding command to the decoder means and thereafter, the decoder means, when receiving a record start request from the receiver means or the encoded-data memory means, performs its decoding operation without any intervention of the control unit and when receiving a page end request from the receiver means or the encoded-data memory means, terminates its decoding operation without any intervention of the control unit and sends a decoding end signal to the control unit and the recorder means, and the control unit sends the decoding end command to the recorder means for its decoding operation.

In accordance with a fourth aspect of the present invention, the other objects can be attained by a high-speed image signal processing system in which, during the encoding and decoding operations executed by encoder means and decoder means, each of the encoder means and decoder means includes a line memory means having a storage capacity corresponding to three lines, and in which the line memory means has a function of preventing encoding of a line whose readout data is not fully input yet, a function of preventing recording of the decoded data in a line not fully input yet and a function of preventing writing of a restored image data again onto a restored image data not recorded yet.

In the first aspect of the present invention for attaining the above other objects, in the encoding/decoding operations, when the data input/output means requests an encoding/decoding operation of the image data read out from the original document or of the encoded data received from the line, the control unit instructs the encoder/decoder means to start its encoding/decoding operation. Thereafter, the encoder/decoder means sequentially performs its encoding/decoding operation over the data on the basis of the data (in which a page unit is defined) regarding a shift in the data received from the data input/output means in its sub-scanning direction without any intervention of the control unit, and when receiving an encoding/decoding end request from the data input/output means, terminates its encoding/decoding operation and sends the encoding/decoding end signal to the control unit. At this time, the control unit detects the end signal received from the encoder/decoder means and initiates the next control operation.

In the second aspect of the present invention for attaining the above other objects, in the encoding operation, the control unit, prior to the start of the encoding operation of the data obtained through the reading of the original document, sends an encoding command necessary for the encoding operation to the encoder means to put the encoder means in its encoding preparation mode. Thereafter, the encoder means independently determines the timing of the start of the encoding operation and then encodes the data obtained from the document on an every page basis. Further, the encoder means also independently determines the timing of terminating the encoding operation and on the basis of its determination, terminates its encoding operation and sends an encoding end signal to the control unit. At this time, the control unit detects the end signal received from the encoder means and initiates the next control operation.

Further, in the third aspect of the present invention for attaining the above other objects, in the decoding operation, the control unit, prior to the start of the decoding operation on the input encoded data, sends a command necessary for the decoding operation to the decoder means to put the decoder means in its decoding preparation mode. Thereafter, the decoder means independently detects the timing of the start of the decoding operation and then decodes the input encoded data on an every page basis. Further, the decoder means also independently determines the timing of terminating the decoding operation and on the basis of its determination, terminates its decoding operation and sends a decoding end signal to the control unit. At this time, the control unit detects the end signal received from the decoder means and initiates the next control operation.

Through the above operations, the need for the control unit to control the encoding/decoding operation on a real time basis during such operation can be eliminated and thus the load on the control unit can be remarkably reduced. Further, since the time necessary for the real time control can be utilized for other data processing, the control unit can execute the encoding/decoding operation at a high speed.

Even when the processing speed of the encoding/decoding operation is increased through the above operations as mentioned above, the processing load on the control unit in the present invention can be reduced when compared with the prior art system in which the control unit controls the timing of the start and end of the encoding/decoding operation and also controls the encoder means and the decoder means on a real time basis. Accordingly, the need for the use of a high speed processor having a high performance and the necessity for the use of a multiprocessor can be eliminated.

In the fourth aspect of the present invention for attaining the above other objects, during the encoding operation of the document read data or during the recording operation of the decoded data, since the data is temporarily stored in the line memory means having a storage capacity corresponding to 3 lines, the processing speed can be increased in a pipeline processing manner. Further, since the line memory means has functions of preventing the encoding of the data in a line not fully input yet, preventing output of the recorded data in a line not fully input yet to the recorder means and preventing writing of the restored image data again on the restored image data not fully recorded yet, the need for the provision of a control means for normally controlling flows of codes and image data can be eliminated.

Even when a paper sheet having an A3 size is read at a rate of 400 dpi, it is sufficient for the line memory means to have a 3-line capacity of about 2K bytes. And for high-speed management of the line memory means, the use of processors built in the encoder means and decoder means rather than the use of independent processors is economical from the hardware viewpoint and the arrangement can be simplified.

In this way, merely since the control unit is operated as associated with the encoder means and the decoder means on an every document page basis, the data reading to the encoder means and the data recording to the decoder means can be increased in speed with a high cost effectiveness.

BRIEF DESCRIPTION OF THE DRAWINGS

FIG. 3 is a diagram for explaining the exemplary operation of a register contained in a code transfer unit 110 in FIG. 1;

FIG. 4 shows an exemplary management table in a document management data memory 80 in FIG. 1;

DESCRIPTION OF THE PREFERRED EMBODIMENTS

Embodiments of a high-speed image signal processing system in accordance with the present invention will be detailed with reference to the accompanying drawings.

The following explanation of the embodiments will be made on the assumption that the high-speed image signal processing system comprises a facsimile apparatus, an image signal to be processed is of a bit map binary type to be used in the facsimile apparatus, and one of the MH coding, the MR coding and the MMR coding of International Standard codings is used for the facsimile apparatus as an encoding system prescribed in T.4 and T.6 recommended by the CCITT.

The following explanation will further be made on the assumption that a laser printer commonly used for the facsimile apparatus is employed as a constant speed recording means, encoding processing is carried out on an every line basis, and transfer and communication are carried out on an every page basis.

The application object of the present invention is limited to the above specific example only for convenience of explanation of the embodiments, but it is to be clearly understood that the present invention is not restricted to the above example. Thus, the present invention may be applied to other devices or equipment than the facsimile apparatus as the high-speed image signal processing system, and is covered by the scope of the appended claims.

Prior to explanation of the following embodiments, brief explanation will first be made as to the general arrangement of the facsimile apparatus to which the present invention is applied, which arrangement is shown, for example, in FIG. 2.

Figure 2:
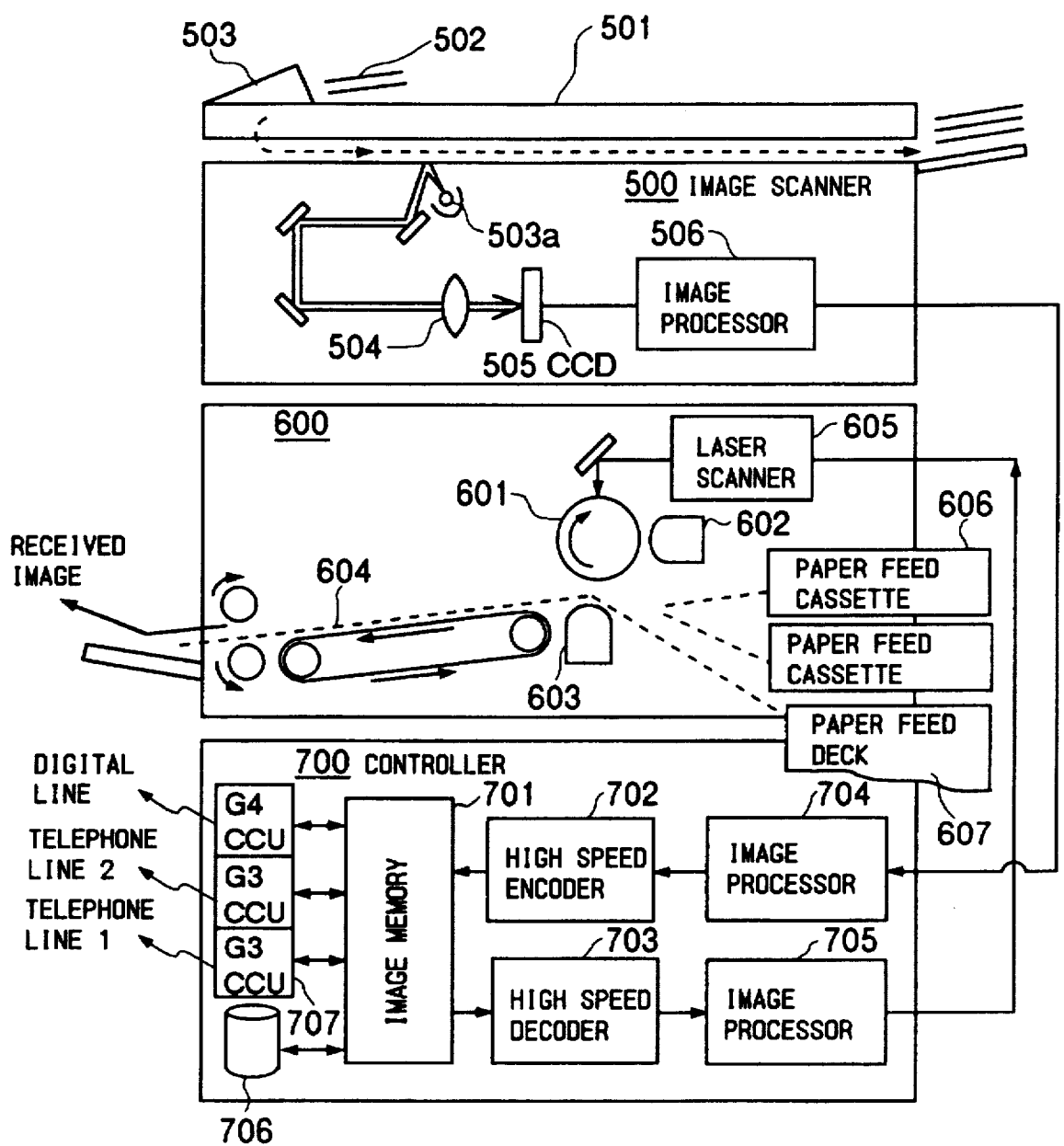
FIG. 2 schematically shows a general structure of the facsimile apparatus to which the present invention can be applied.

In FIG. 2, the facsimile apparatus comprises an image scanner 500, a laser printer 600 and a controller 700. The image scanner 500 includes an original document carrier base 501, an original document sheet stacker 502, an automatic document paper feeder 503, a fluorescent lamp 503a, a lens system 504, a charge coupled device (CCD) 505 and an image processor 506. The laser printer 600 includes a photosensitive drum 601, a developing unit 602, a transfer unit 603, a paper transporter 604, a laser scanner 605, a paper feed cassette 606 and a paper feed deck 607. Further, the controller 700 includes an image memory 701, a high-speed encoder 702, a high-speed decoder 703, image processors 704 and 705, a hard disk 706 and a communication unit 707.

The brief operation of the facsimile apparatus is as follows.

In the image scanner 500, an original document sheet 502 placed on the document carrier base 501 is automatically fed by the automatic paper feeder 503 to a scanning position where scanning is carried out with use of the light source 503a. A light signal obtained through the scanning operation is sent through the lens system 504 to the CCD 505 to be converted into an electric signal thereat. The electric signal is further sent to the image processor 506 to be converted thereat into an image signal that in turn is output as an output of the image scanner 500.

Next, in the laser printer 600, the photosensitive drum 601 to be rotated at a constant speed in its operative mode, developing unit 602, transfer unit 603, paper transporter 604, laser scanner 605, paper feed cassette 606 and paper feeding deck 607 make up a known electrophotographic recording system. Since the image signal to be recorded is sent from the controller 700 to the laser scanner 605, the image signal is recorded in the recording system. In the controller 700, further, the image signal received from the image scanner 500 is processed at the image processor 704 and then encoded at the high-speed encoder 702. An encoded signal thus obtained from the encoder 702 is accumulated in the image memory 701 or the hard disk 706, or transmitted via the communication unit 707 to another facsimile apparatus. Meanwhile, in the communication unit 707, a coded signal received from another facsimile apparatus is accumulated in the image memory 701 or the hard disk 706, or is decoded at the high speed decoder 703 to an image signal, processed at the image processor 705, and then sent to the laser printer 600 to be output as an image printout of the received image signal.

Explanation will then sequentially be made as to the respective embodiments of the present invention.

Figure 1:
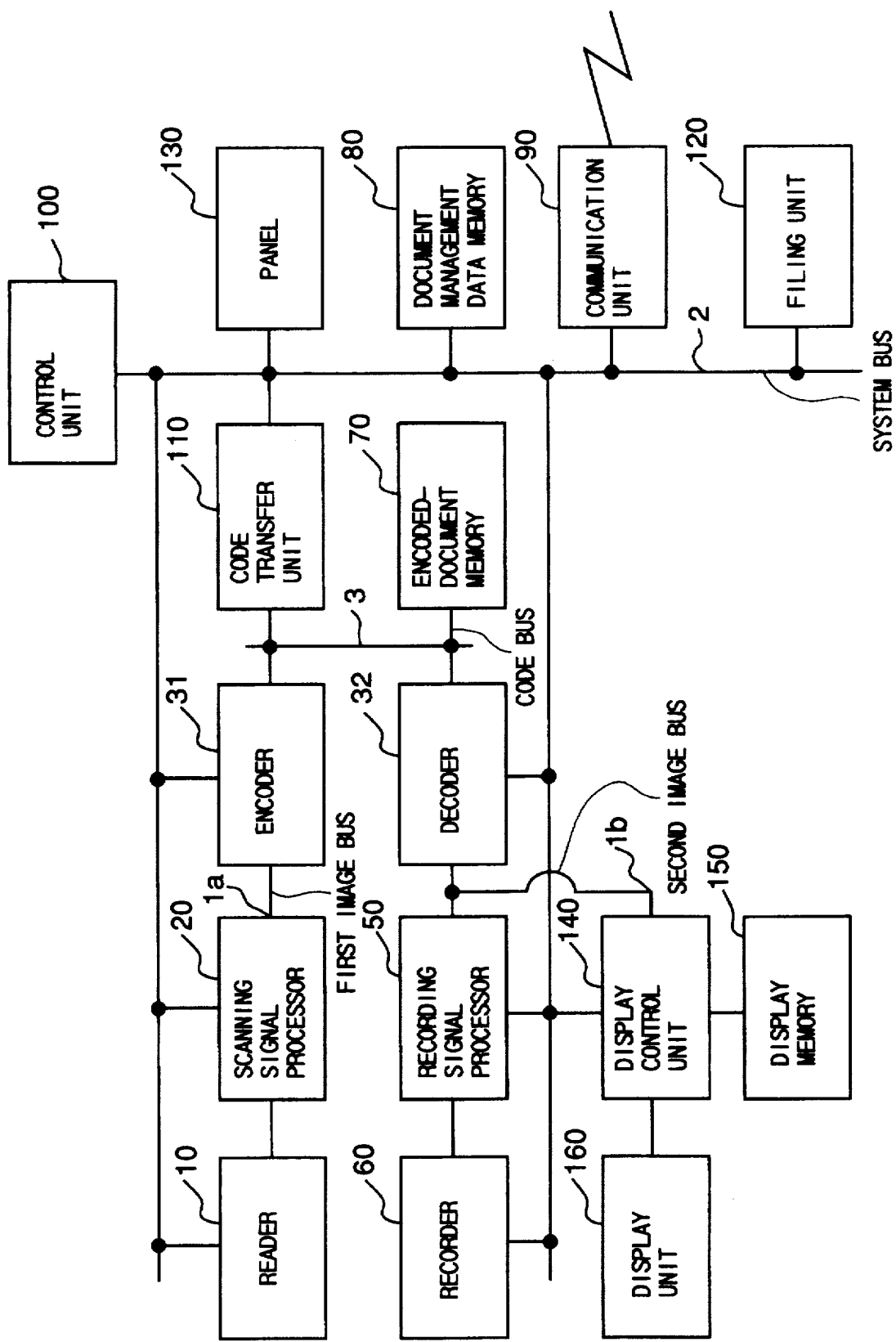
FIG. 1 is a block diagram of an arrangement of a facsimile apparatus in accordance with an embodiment of the present invention.

Referring first to FIG. 1, there is shown a block diagram of a facsimile apparatus in accordance with a first embodiment of the present invention.

In FIG. 1, the illustrated facsimile apparatus includes first and second image buses 1a and 1b, a code bus 3, an encoded document memory 70, a code transfer unit 110, a filing unit 120, a panel 130, a display control unit 140, a display memory 150 and a display unit 160. The term 'code bus 3' as used herein refers to a bus through which encoded signals (or encoded document signals) are exclusively transferred, and which is provided as separated from the image buses 1a and 1b for transferring therethrough only image signal and from a system bus 2 for also transferring therethrough control signals from a control unit 100.

A reader 10, which including, e.g., a charge coupled device (CCD) as a photoelectric element and a pulse motor as a means for scanningly moving the document, generates an image signal through the scanning operation of an original document. A scanning signal processor 20, which comprises, e.g., an LSI HD63084 available from Hitachi, Ltd., corrects distortion in the image signal, converts the corrected image signal into a high-quality binary image signal and then outputs it onto the first image bus 1a. An encoder 31, which comprises, e.g., an LSI HD63183 available from Hitachi, Ltd., receives the high quality binary image signal from the first image bus 1a, subjects it to the MH, MR or MMR coding operation to obtain an encoded signal, and then outputs the encoded signal onto the code bus 3. The image bus 1a is a data bus through which the high quality binary image signal is transferred from the scanning signal processor 20 to the encoder 31. The encoded-document memory 70, which comprises, e.g., a semiconductor memory, stores therein the encoded signal (document) on an every page basis. Transfer of the encoded signal from the encoder 31 to the encoded-document memory 70 is carried out through the code bus 3.

A decoder 31, which comprises, e.g., an LSI HD 63183 available from Hitachi, Ltd., receives the coded signal through the code bus 3 from the encoded-document memory 70, decodes it to its original binary image signal, and then sends the original binary image signal to a recording signal processor 50 through the second image bus 1b. The recording signal processor 50 receives the image signal of, e.g., 8 pixels/mm from the second image bus 1b, converts it to a high-quality image signal of 16 pixels/mm, and then supplies the high-quality image signal to a recorder 60. The recorder 60, which comprises, e.g., a laser printer as mentioned above, prints the received image signal on recording paper.

A document management data memory 80, which comprises, e.g., a semiconductor memory, stores therein data on management of the coding system and memory regions of document signals stored in the encoded-document memory 70. The document management data memory 80 includes such a management table 800 as shown in FIG. 4. A communication unit 90, which comprises a modem when the communication line is telephone line, performs transfer of coded signals between the system bus 2 and the communication line. The filing unit 120, which comprises, e.g., an optical disk or a hard disk, accumulatively stores therein a large amount of coded signals.

Interconnection between the document management data memory 80, communication unit 90 and filing unit 120 is effected by means of the system bus 2. The code transfer unit 110 performs transfer of the coded signals among the encoder 31, the decoder 32, the communication unit 90, the filing unit 120 and the encoded-document memory 70. The code transfer unit 110, as shown in FIG. 3, has a register 1101 for storing a command received from the control unit 100, a register 1102 for storing a heading address of one page in the encoded-document memory 70, a register 1103 for storing a final address of the associated page in the encoded-document memory 70, and a register 1104 based on, e.g., direct memory access (DMA) as a transfer system for storing a transfer byte number. The display control unit 140 receives a binary image signal decoded at the decoder 32 and converts it into a display image signal indicative of a resolution suitable for display. In the illustrated example, the resolution conversion is, e.g., from 8 pixels/mm to 2 pixels/mm. The display memory 150, which usually comprises a semiconductor memory, stores therein the display image signal to be displayed on the display unit 160. The display unit 160, which comprises a cathode-ray tube (CRT) or liquid crystal panel, displays the display image signal thereon. The control unit 100, which comprises, e.g., a microprocessor, performs input/output of control signals through the system bus 2 to execute various sorts of controls over the entire facsimile apparatus. The panel 130 comprises an interface through which a user demands desired processing by the facsimile apparatus, for example the user enters a facsimile apparatus number.

The operation of the facsimile apparatus having such an arrangement as mentioned above will be explained below. The operation is roughly divided into basic and application operations which follow.

1. Basic operation

① Reading operation

This operation is until the image signal read from the reader 10 is temporarily stored in the encoded-document memory 70. More specifically, first, the control unit 100 outputs a read command to the reader 10 a high-quality command to the scanning signal processor 20, an encode command to the encoder 31, a transfer command to the code transfer unit 110 for transfer of the encoded signal from the encoder 31 to the encoded-document memory 70, and a transfer-destination heading address of the encoded-document memory 70 all through the system bus 2. The transfer command is stored in the register 1101 and the transfer-destination heading address is stored in the register 1102 in FIG. 3 respectively. In response to these commands, the reader 10 scans the original document, generates an image signal, and outputs it to the scanning signal processor 20.

Next, the scanning signal processor 20 subjects the received image signal to a high-quality converting operation on a real time basis to generate a binary image signal and output the binary image signal onto the first image bus 1a. The encoder 31 then reads the binary image signal from the first image bus 1a with use of any one of three line memories built therein, subjects the read binary image signal to an encoding operation with use of the remaining two line memories (corresponding to reference and encoding lines in the MMR coding) to obtain an encoded signal, and then outputs the encoded signal onto the code bus 3. In this case, when an encoding time per line is selected to be smaller than a reading time per line, the aforementioned processing can be carried out with use of the three line memories without any overflow of the data.

Subsequently, the code transfer unit 110 transfers the encoded signal on the code bus 3 into the encoded-document memory 70 on a real time basis, and the encoded signal is stored in the encoded-document memory 70 at an address designated by the control unit 100.

When the reader 10 finishes its reading operation of the last line of page 1 of the document, it sends page end signal to the scanning signal processor 20 which in turn sends the page end signal to the encoder 31. The encoder 31, when completing its encoding operation of the last line of the page, sends the page end signal to the control unit 100. The control unit 100, when receiving the page end signal from the encoder 31, gets from the register 1103 of FIG. 3 an address at which the final coded signal is stored, calculates the encoded signal of the document page (byte number) to obtain document management data, stores the heading address of the first page and the document management data in the document management data memory 80, at which stage the full processing of the first page is completed.

Similar operation is carried out for the second page and subsequent pages. When all the pages are processed, document management data, including the number of pages of the encoded document and addresses at which the respective pages are stored, are stored in the document management data memory 80, whereby the reading operation is completed. Various sorts of data within the document management data memory 80 are managed with use of a management table 80 such as shown in FIG. 4. In FIG. 4, a first line 801 stores a document label (number), such document data as coding system, line density and reduction rate, and a total page number; and the second and subsequent lines store respectively a byte number for each page and a heading address in the encoded-document data memory 70 with respect to each page, i.e., on an every page basis.

② Transmission

This operation is performed when the encoded signal (encoded document) stored in the encoded-document memory 70 is transmitted. In more detail, first of all, the control unit 100, when detecting the end of the above reading operation for one document, sends destination data entered from the panel 130 to the communication unit 90 to call a destination facsimile apparatus (not shown). When the communication unit 90 is connected to the destination facsimile apparatus through its communication line, the control unit 100 reads out from the line 802 of the management table 800 the heading address of the encoded document in the encoded-document memory 70 to be transmitted under control of the document management data memory 80, reads out from the line 802 of the table the read-out heading address and the byte number of an encoded signal (document) of the encoded document to be transmitted, and sets the register 1104 of the code transfer unit 110. Thereafter, the control unit 100 issues to the register 1101 of the code transfer unit 110 a command for transfer from the encoded-document memory 70 to the communication unit 90 and also outputs a transmission command to the communication unit 90.

At this time, the communication unit 90 issues to the code transfer unit 110 a transfer request of the encoded signal (document) having a transmission rate to be transmitted. The code transfer unit 110, when receiving the transfer request from the communication unit 90 reads out the encoded signal (document) for transmission from the address of the encoded-document memory 70 and transfers the read-out encoded signal to the communication unit 90 through the system bus 2. The communication unit 90 subjects the received encoded signal (document) to a medium conversion to obtain a signal matched with the type of the destination machine, and transmits the converted encoded signal to the destination machine. At this stage, the memory transmission is completed. The 'medium conversion' means to convert the received signal into a signal having a format conforming to the ability of the destination machine type because different types of machines have different reception abilities, and particularly includes conversion of page size, conversion of coding method, conversion of resolution and a combination thereof.

③ Filing operation

This operation is performed when the encoded signal (document) stored in the encoded-document memory 70 is filed. First, the control unit 100, when detecting the end of the above reading operation of one document, reads out from the line 802 of the document management data memory 80 a heading address at which the encoded document to be filed is stored, and sets the read-out heading address and the encoded signal (document page) (byte number) to be filed respectively in the registers 1102 and 1104 of the code transfer unit 110. Then the control unit 100 issues to the register 1101 of the code transfer unit 10 a command for transfer from the encoded-document memory 70 to the filing unit 120, and also issues a document identifier and a filing command to the filing unit 120. The filing unit 120, when receiving the filing command, outputs a transfer request of the encoded signal (document) to be filed to the code transfer unit 110. The code transfer unit 110, when receiving the transfer request from the filing unit 120, reads out the encoded signal (document) to be filed from the aforementioned address of the encoded-document memory 70, and transfers the read-out encoded signal to the filing unit 120 through the system bus 2. The filing unit 120 stores the received encoded signal (document) in a large-capacity memory medium such as an optical disk, thus completing the memory filing operation.

④ Receiving operation

This operation is performed after the reception of a reception request of the encoded signal (document) when the received encoded signal is temporarily stored in the encoded-document memory 70. First, the communication unit 90, when receiving a facsimile signal receive request from an external facsimile apparatus (not shown), informs the control unit 100 of the received request. In response to it, the control unit 100 outputs to the registers 1101 and 1102 of the code transfer unit 110 a code command for transfer from the communication unit 90 to the encoded-document memory 70 as well as the heading address of the encoded-document memory 70 to be transferred respectively, and also issues a reception command to the communication unit 90. Then, the communication unit 90 subjects the encoded signal (document) received from the facsimile apparatus to a medium conversion to obtain a medium-converted encoded signal having a format conforming to the type of its own receiver facsimile apparatus, outputs the medium-converted encoded signal onto the system bus 2, and issues to the code transfer unit 110 a request for transfer of the received encoded signal. The code transfer unit 110, when receiving the transfer request from the communication unit 90, transfers the received encoded document from the system bus 2 to the code bus 3 and then writes the transferred encoded signal into the aforementioned address of the encoded document memory 70.

The communication unit 90, when completing the reception of the encoded signal corresponding to one page, issues a one-page reception end signal, indicative of the completion of one-page reception, to the control unit 100. The control unit 100, when receiving the one-page end signal, issues a transfer end command of the received encoded signal to the code transfer unit 110 and also outputs the final address of the associated page of the transferred encoded signal to the register 1103 of the code transfer unit 110. And the control unit 100 writes in the management table 800 of the document management data memory 80 document management data including the heading address of the received encoded signal corresponding to the associated one page and the byte number of the encoded signal. Subsequently, the similar operation is carried out for the second and subsequent pages. The control unit 100, when receiving a command indicative of the completion of reception of one encoded document from the communication unit 90, writes in the code management data memory 80 document management data including the number of pages of the received encoded document, thus completing the receiving operation.

⑤ Recording

This operation is performed when the encoded signal (document) temporarily stored in the encoded-document memory 70 is decoded into the image signal and the decoded image signal is recorded on paper by the recorder 60. First, the control unit 100 gets document management data for the encoded signal to be recorded from the management table 800 of the document management data memory 80, outputs a code command for transfer of the encoded signal from the encoded-document memory 70 to the encoder 32, a heading address at which the encoded signal is to be stored and a byte number thereof respectively to the registers 1101, 1102 and 1104 of the code transfer unit 110; and also outputs a decode command to the decoder 32, a high-quality command to the recording signal processor 50, and a record command to the recorder 60 respectively. The decoder 32, when receiving the decode command, issues a request for transfer of the encoded signal to be recorded to the code transfer unit 110. The code transfer unit 110, when receiving the transfer request from the decoder 32, reads out the encoded signal from the aforementioned address of the encoded-document memory 70 and then sends the encoded signal to the decoder 32 through the code bus 3. The decoder 32 decodes the received encoded signal into a binary image signal and stores the binary image signal in decoding line memories built therein. In this case, the line memories include at least three of reference, decoding and transfer line memories.

When the decoding of the encoded signal corresponding to one line to be recorded is completed, the decoding line functions as the reference line, the reference line as the transfer line, the transfer line as the decoding line to get ready for the next operation. The decoder 32, in response to a request from the recording signal processor 50, supplies the decoded binary image signal at the transfer line to the recording signal processor 50 through the second image bus 1b on a real time basis. The recording signal processor 50, responding to a request from the recorder 60, converts the binary image signal received from the decoder 32 into a high-quality record image signal on a real time basis and outputs the high-quality record image signal to the recorder 60, at which stage the recording operation is completed.

⑥ Filed document reading operation

This operation is performed when the encoded signal filed in the filing unit 120 is read out and the read-out encoded signal is temporarily stored in the encoded document memory 70. First, the control unit 100 issues to the filing unit 120 an identifier of the encoded signal to be read out and its read-out command, and at the same time, issues a command for transfer of the encoded signal from the filing unit 120 to the encoded-document memory 70 and the heading address at which the encoded signal is to be transferred, respectively to the registers 1101 and 1102 of the code transfer unit 110. The filing unit 120, when receiving the identifier of the encoded signal to be read out and its read-out command, reads out the encoded signal on an every page basis and issues a request for transfer of the readout encoded signal to the code transfer unit 110. The code transfer unit 110, when receiving the transfer request, transfers from the system bus 2 to the code bus 3 the coded signal output from the filing unit 120, and then writes the coded signal at the aforementioned address of the encoded-document memory 70. The filing unit 120, when the encoded signal to be read out arrives at a break between its pages or documents, notifies the control unit 100 of the end of the page or document. The control unit 100, when receiving the notification from the filing unit 120, writes in the management table 800 of the document management data memory 80 document management data including a storage address of the page or document and the byte number of the encoded signal to be read.

⑦ Display

This operation is performed when the encoded signal stored in the encoded-document memory 70 is decoded and displayed on the display unit 160. First, the control unit 100 gets document management data about the encoded signal to be displayed from the management table 800 of the document management data memory 80, outputs to the registers 1101 and 1104 of the code transfer unit 110 a command for transfer of the encoded signal from the encoded-document memory 70 to the decoder 32 and a heading address at which the encoded signal is to be stored and its transfer byte number respectively, and also issues a decode command to the decoder 32 and a display command to the display unit 140.

The decoder 32, when receiving the decode command, issues to the code transfer unit 110 a request for transfer of the encoded signal to be displayed. The code transfer unit 110, when receiving the transfer request from the decoder 32, reads out the encoded signal to be displayed from the aforementioned address of the encoded-document memory 70, and then supplies the read-out encoded signal to the decoder 32 through the code bus 3. The decoder 32 decodes the received encoded signal into a binary image signal and stores the decoded binary image signal in the decoding line memories built therein. Subsequently, the decoder 32 in response to a request received from the display control unit 140 sends the decoded binary image signal on the transfer line to the display control unit 140 through the second image bus 1b.

Next, the display control unit 140 performs resolution conversion over the binary image signal received from the decoder 32 to generate a display image signal, writes the display image signal in the display memory 150, and also reads out the display image signal from the display memory 150, and sends the display image signal to the display unit 160 to display the encoded signal, at which stage the memory displaying operation is completed.

2. Application operation

① Facsimile transmission

This operation is achieved by combining the aforementioned reading operation ① and transmitting operation ②. In this case, since the reading operation is carried out independently of the transmitting operation, the document reading operation can be carried out at a high speed regardless of the transmission rate of the communication line. The system bus 2, which is usually connected to many control objects, is fixed in its bus throughput. However, since no encoded signals flow through the system bus 2 in the memory read-in mode, high-speed processing can be achieved and high-speed and constant-speed reading can be achieved without any page memories.

For example, in the case where a document sheet having an A4 size is scanned and read at a rate of 8 pixels/mm (in this case, 4 mega pixels per second are processed), since the page memory is absent, it is necessary to provide MH coding on a real time basis in conformity with the reading rate. Further, since the amount of codes is 4.5 times the maximum image, the rate of the encoded signal output from the encoder 31 reaches 18 megabits/sec. When the encoded Signal flows at this rate through the system bus 2, the load on the system bus 2 becomes large, and this causes trouble in the initially intended role of the system bus, i.e., in the transmission of the system control signals therethrough. However, in the present embodiment, since the encoded signal flows through only the code bus 3 in the memory reading operation mode, memory reading operation at a high and constant speed can be achieved without using any page memories. Further, when the second document is read, since the encoded signal issued at a high rate from the encoder 31 does not flow through the system bus 2, the memory transmitting operation of the first document can be achieved at the same time, whereby the throughput of the entire system can advantageously be made high.

② Reading/Filing operation

This operation can be achieved by combining the reading operation ① and the filing operation ③. In the reading/filing operation mode of the present embodiment, like the facsimile transmission mode, advantageously, reading can be achieved at a high and constant rate without using any page memories, the load on the system bus 2 can be lightened, and the system throughput can be improved.

③ Facsimile receiving

This operation can be achieved by combining the receiving operation ④ and the recording operation ⑤. Even in this mode, since the recording operation is carried out independently of the receiving operation, document recording can be achieved at a high rate regardless of the transmission rate of the communication line. As has been explained above, the system bus 2 usually is fixed in its bus throughput because the bus is connected with many control objects. However, since the encoded signal does not flow through the system bus 2 in the memory recording mode, the received signal can be processed at a high speed, and recording at a high and constant speed as by means of a laser printer can be achieved without using any bit map page memories.

For example, in the case where a document sheet having an A4 size is scanned at a resolution rate of 8 pixels/mm and the MH-coded document is recorded in one second (in this case, 4 mega pixels per second are processed), since the page memory is absent, it is necessary to provide MH coding on a real time basis in conformity with the reading rate. Further, since the amount of codes is 4.5 times the maximum image, the transfer rate of the encoded signal input to the decoder 32 reaches 18 megabits/sec. When the encoded signal flows at this rate through the system bus 2, the load on the system bus 2 becomes large, and this causes trouble in the initially intended role of the system bus, i.e., in the transmission of the system control signal therethrough. However, in the present embodiment, since the encoded signal flows through only the code bus 3 in the recording operation mode, recording at a high and constant speed can be achieved without using any bit map page memories. Further, when the first document is recorded, since the encoded signal does not flow through the system bus 2, the receiving operation of the second document can be achieved at the same time, whereby the throughput of the entire system can advantageously be made high.

④ Filed document recording operation

This operation can be achieved by combining the filed document reading operation ⑥ and the memory recording operation ⑤. In the filed/document recording operation mode of the present embodiment, like the facsimile reception mode, advantageously, recording can be carried out at a high and constant rate without using any bit map page memories, the load of the system bus can be lightened, and the system throughput can be improved.

⑤ Reading/display

This operation can be achieved by combining the reading operation ① and the displaying operation ⑦.

⑥ Receiving/display

This operation can be achieved by combining the receiving operation ④ and the memory display ⑦.

⑦ Filing/display

This operation can be achieved by combining the file reading operation ⑥ and the memory displaying operation ⑦.

Since such a series of displaying operations ⑤ to ⑦ as mentioned above cause the decoding and display of the encoded signal stored in the encoded-document memory 70 connected to the code bus 3, the load on the system bus 2 can be made low. Further, since display can be achieved without using any page memories for storing therein the document, two operations of transferring the decoded image signal, i.e., the decoded image signal is once stored in the page memory, again read out therefrom and then transferred to the display control unit 140, which would be required in the prior art, can be replaced by one transfer operation in the present embodiment. Thus, in the present embodiment, display can be carried out at a correspondingly higher rate. Further, since the display image signal stored in the display memory 150 is generally lower in resolution than the decoded image signal and is small in screen size, it is possible for the necessary storage capacity of the display memory 140 to be smaller than that of the page memory, whereby reduction in the cost can be advantageously obtained.

⑧ Copy

This operation can be achieved by combining the reading operation ① and the recording operation ⑤.

As has been explained in the foregoing, in the present embodiment, since all the basic operations are carried out with the encoded-document memory 70 used as their starting or ending point in the signal transfer, two or more discrete operations, e.g., such as the reading operation and the facsimile receiving operation can be processed simultaneously, whereby the overall system throughput can be advantageously improved. The present embodiment has also another advantage in that, even when two or more discrete operations, e.g., such as the reading operation and the facsimile receiving operation, can be performed simultaneously, the encoded signal (document) flowing through the system bus 2 is the only one which is transferred from the communication unit 90 to the encoded-document memory 70, whereby two or more independent operations can be sufficiently processed with a small load imposed on the system bus 2.

Figure 5:
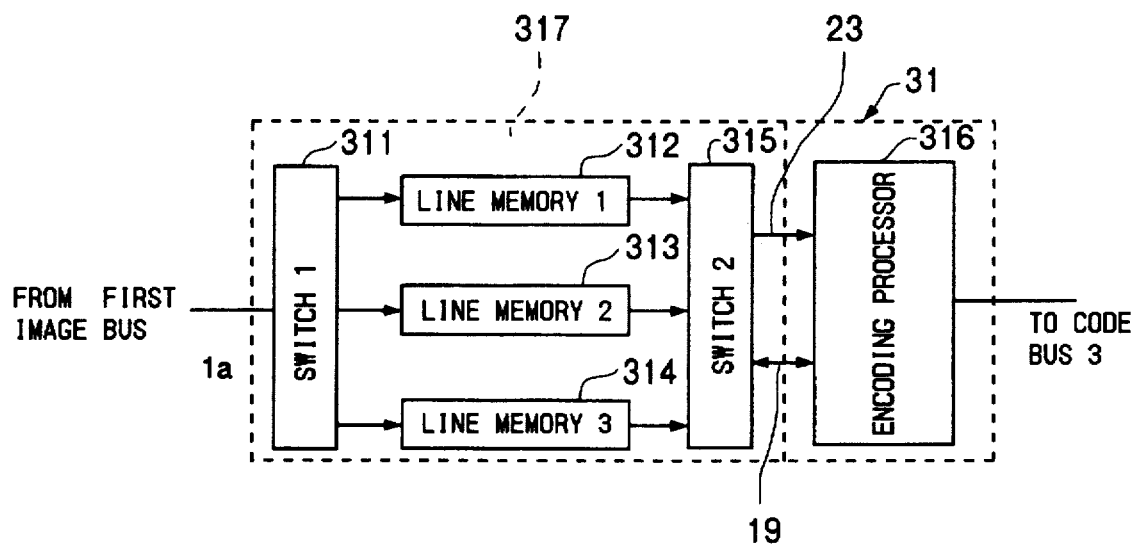
FIG. 5 is a block diagram of a detailed structure of an encoder in the present invention.

Shown in FIG. 5 is a block diagram of a detailed structure of the encoder 31 in FIG. 1, which includes a first switch 311, first to third line memories 312 to 314, a second switch 315 and an encoder circuit 316.

The operation of the encoder 31 of FIG. 5 is as follows.

Each of the first, second and third line memories 312, 313 and 314 has a storage capacity capable of storing an image signal corresponding to one line of a document. The line memories 312 to 314 are used as a transfer line for the image signal received from the scanning signal processor 20 through the first image bus 1a, as a coding line for encoding the image signal and as a reference line at the time of two-dimensional coding (MMR and MR) respectively.

The first switch 311 is used to select one of the three line memories 312 to 314 as the transfer line. For example, when the first switch 311 selects the first line memory 312 as the transfer line and the transfer of the one-line image signal is completed, the first switch then selects the second line memory as the transfer line for the next line, and so on. In this way, the first switch sequentially selects one of the three line memories 312 to 314 on an every line basis to be connected to the first image bus 1a.

The second switch 315 acts to select the reference and coding lines from the three line memories 312 to 314 to be selectively connected to the encoder circuit 316. For example, when the second switch 315 selects the second line memory 313 as the reference line and the third line memory 314 as the coding line and encoding corresponding to one line is completed, the second switch then selects, for the next line, the third line memory 314 as the reference line and the first line memory 312 as the coding line. Further, the encoder circuit 316, which performs the MH, MR and MRR coding operation, receives the image signals of the reference and coding lines (the reference line being unnecessary for the MH coding) and outputs an encoded signal onto the code bus 3. The operation of the encoder circuit 316 and the operation associated with the encoder circuit 316 are substantially the same as those of this type of circuits in the prior art and thus detailed explanation thereof is omitted.

Figure 6:
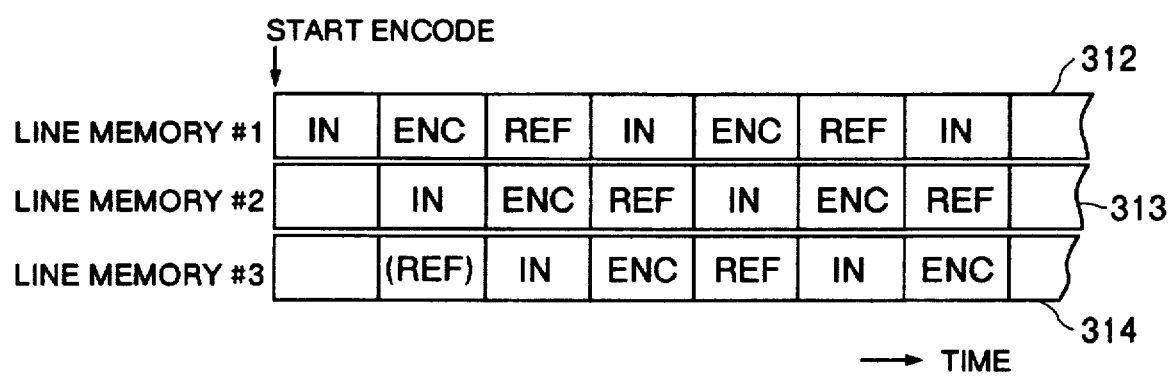
FIG. 6 is a timing chart for explaining the processing operations of respective parts ranging from reading to encoding.

FIG. 6 is a timing chart for explaining the operations of the respective line memories ranging from the document reading operation to the transfer of the encoded signal to the encoded-document memory 70 (that is, the aforementioned memory reading-in operation) when the encoder 31 of FIG. 5 is used.

In FIG. 6, the horizontal axis denotes time and the line memories 312, 313 and 314 are arranged along the vertical axis. In the drawing, reference symbol IN denotes an image data input line, and symbol ENC denotes a coding line using the reference line REF. Further, symbol (REF) denotes an all-white reference line at the initial value of the reference line. The respective line memories 312, 313 and 314 repeat the IN, ENC and REF operations as shifted respectively by one phase. In this case, an encoding processing time per line, including the transfer time of the encoded signal, is smaller than the scanning time per line, all lines can be encoded in conformity with the scanning rate as shown by the timing chart in FIG. 6. In other words, scanning can be achieved at a high and constant rate with use of the three line memories 312 to 314 within the encoder 31 while eliminating the need for the provision of any bit map page memories between the scanning signal processor 20 and the encoder 31.

Figure 7:
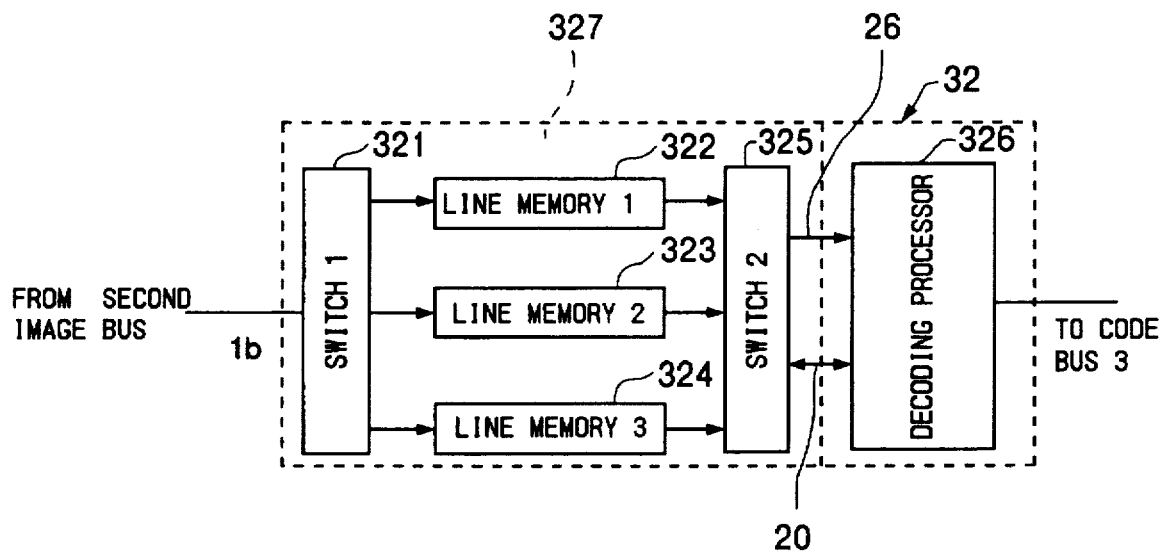
FIG. 7 is a block diagram of a detailed structure of a decoder in the present invention.

Referring to FIG. 7, there is shown a block diagram of a detailed structure of the decoder 32 in FIG. 7, which includes a first switch 321, first to third line memories 322 to 324, a second switch 325 and a decoder circuit 326.

The operation of the decoder 32 of FIG. 7 is as follows.

Each of the first, second and third line memories 322, 323 and 324 has a storage capacity capable of storing an image signal corresponding to one line of a document. The line memories 322 to 324 are used as a transfer line (OUT in FIG. 8) for transferring the image signal to the recording signal processor 50 through the second image bus 1b, as a decoding line (DEC in FIG. 8) for storing the decode image signal and as a reference line (REF in FIG. 8) at the time of decoding of the two-dimensional coding (MMR or MR) respectively.

The first switch 321 is used to select one of the three line memories 322 to 324 as the transfer line. The second switch 325 acts to select the reference and decoding lines from the three line memories 322 to 324 to be connected to the decoder circuit 326. Further, the decoder circuit 326, which performs the decoding operation of the MH, MR and MRR coding operation, receives the encoded signal from the coding bus 3 and writes the decoded image signal in the decoding line. The operation of the decoder circuit 326 and the operation associated with the decoder circuit 326 are substantially the same as those of this type of circuits in the prior art and thus detailed explanation thereof is omitted.

Figure 8:
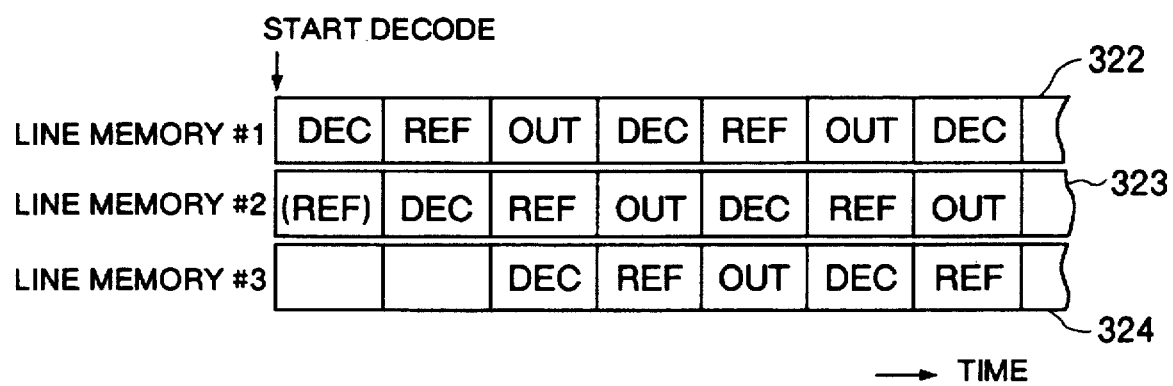
FIG. 8 is a timing chart for explaining the processing operations of respective parts ranging from decoding to recording.

FIG. 8 is a timing chart for explaining the operations of the respective line memories ranging from the transfer of the encoded signal from the encoded-document memory 70 to the decoder 32 to its recording (that is, the aforementioned recording operation) when the decoder 32 of FIG. 7 is used.

In FIG. 8, the horizontal axis denotes time and the line memories 322, 323 and 324 are arranged along the vertical axis. In the drawing, reference symbol DEC denotes a decoding line, symbol REF denotes a reference line and OUT denotes a transfer line. Further, symbol (REF) denotes an all-white reference line at the initial value of the reference line, As will be clear from FIG. 8, the respective line memories 322, 323 and 324 repeat the DEC, REF and OUT operations as shifted respectively by one phase.

In this case, a decoding processing time per line is smaller than the recording time per line, all lines can be decoded in conformity with the decoding rate as shown by the timing chart in FIG. 8. In other words, recording can be achieved at a high and constant rate with use of the three line memories 322 to 324 within the decoder 32 while eliminating the need for the provision of any bit map page memories between the recording signal processor 40 and the decoder 32.

The timing charts for the encoding and decoding operations of the present invention shown in FIGS. 6 and 8 are commonly used even in the embodiments to be explained in the following.

Explanation will then be made as to flow of control signals between the control unit 100 and other elements.

Figure 9:
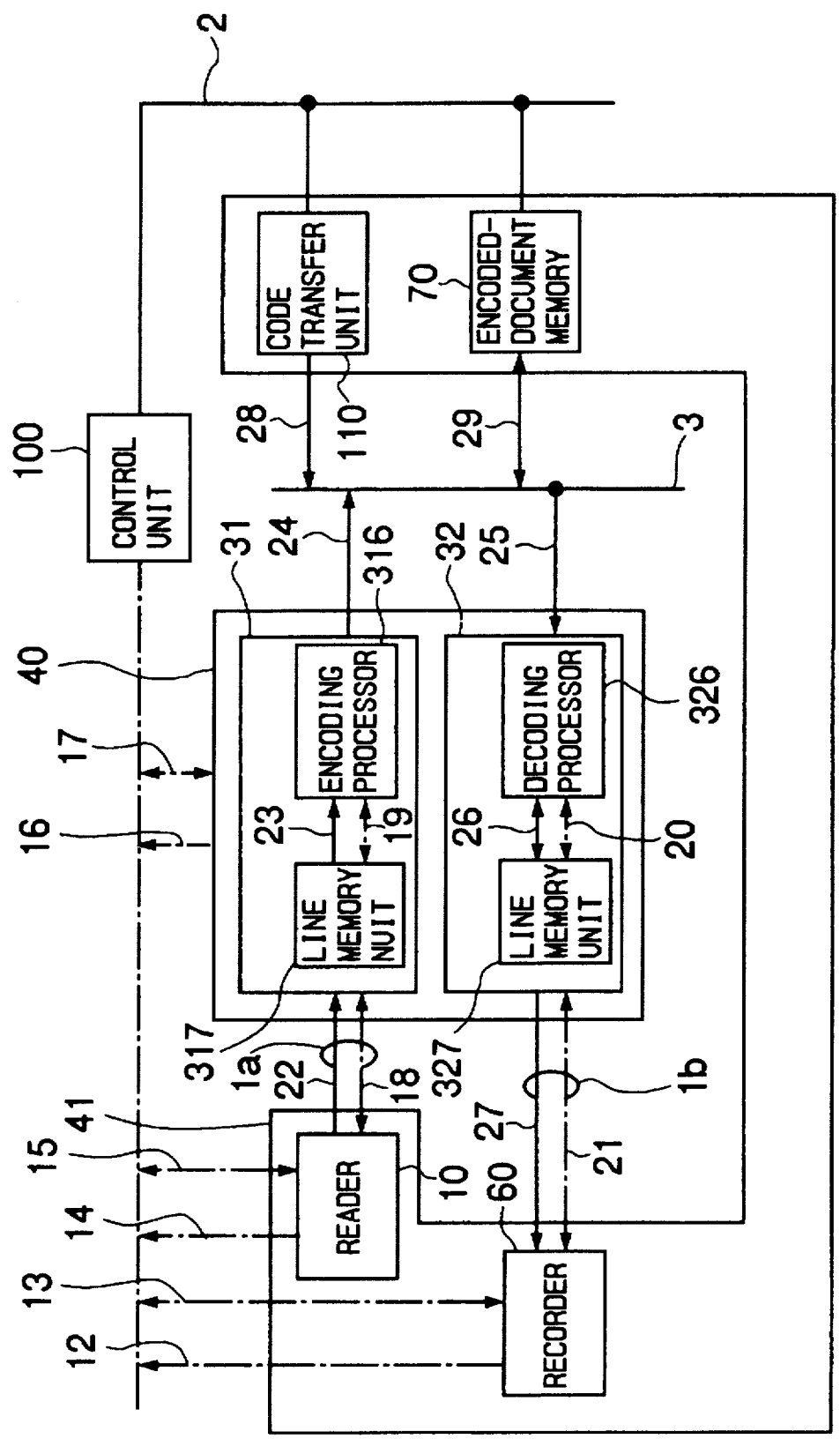
FIG. 9 is a block diagram for explaining flow of control signals in an encoder/decoder part of the present invention.

FIG. 9 shows a block diagram of an arrangement of a major part of a facsimile apparatus based on the encoding/decoding system of the present invention, in which elements equivalent to elements in FIG. 1 are denoted by the same reference numerals. In the drawing, reference numerals 22 to 29 denote data lines. The encoder 31 and the decoder 32 make up an encoder/decoder 40, while the reader 10, recorder 60, code transfer unit 110 and encoded-document memory 70 make up a data input/output unit 41.

The encoder 31 includes an encoding processor 316 and a line memory unit 317; whereas the decoder 32 includes a decoding processor 326 and a line memory unit 327. The reader 10 performs its scanning reading operation over a document, and supplies the scanning image data to the line memory unit 317 of the encoder 31 through the data line 22. The line memory unit 317, which comprises a memory having a storage capacity corresponding to three lines of the document and allowing the reading operation thereof at a constant rate of more than 10 Mb/s, temporarily stores the read image data therein. The stored image data is again read out from the line memory unit 317 for encoding and then supplied to the encoding processor 316 through the data line 23.

Similarly, the line memory unit 327, which comprises a memory having a storage capacity corresponding to three lines of the document and allowing the recording operation thereof at a constant rate of more than 10 Mb/s, temporarily stores therein the image data decoded at the decoding processor 32. The stored image data is again read out from the line memory unit 327 for recording and then supplied through the data line 27 to the recorder 60 to be recorded thereat. The reader 10, recorder 60, encoder 31 and decoder 32 are connected to the control unit 100 through control buses 12 to 17. Interconnections between the reader 10 and encoder 31, between the line memory unit 317 and encoding processor 316, between the decoding processor 326 and line memory unit 327, and between the decoder 32 and recorder 60 are carried out by means of control buses 18 to 21 and the data lines 22, 23, 26 and 27 respectively. In addition, the code transfer unit 110 and the encoded-document memory 70 are connected to the control unit 100 through the system bus 2.

In this case, the code transfer unit 110 and the encoded-document memory 70 are not necessarily required for the control signal processing system of the present invention, and for example in a filing system, may be replaced by a file unit.

Figure 10:
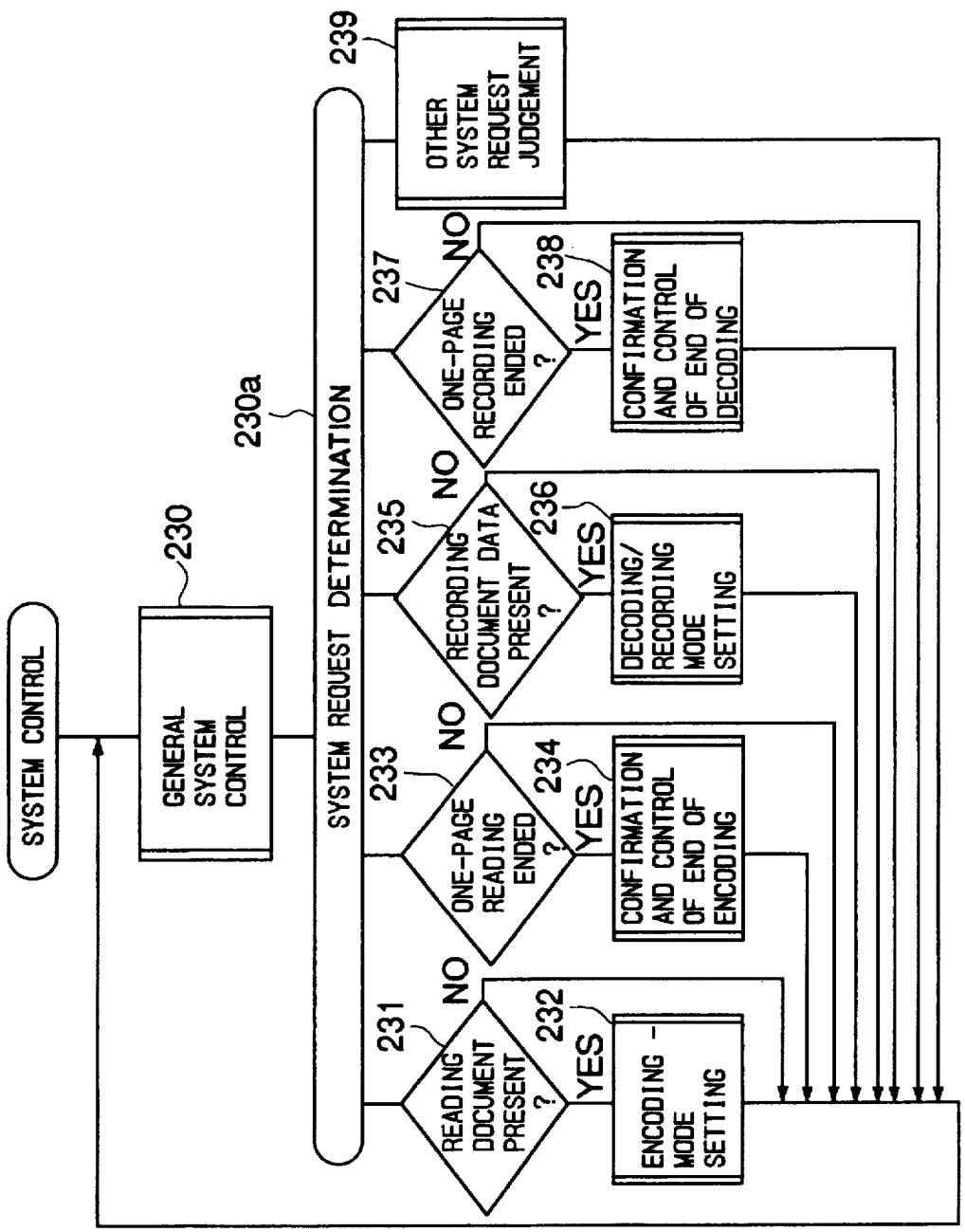
FIG. 10 is a flow chart for explaining how a control unit carries out its processing operations.
Figure 11:
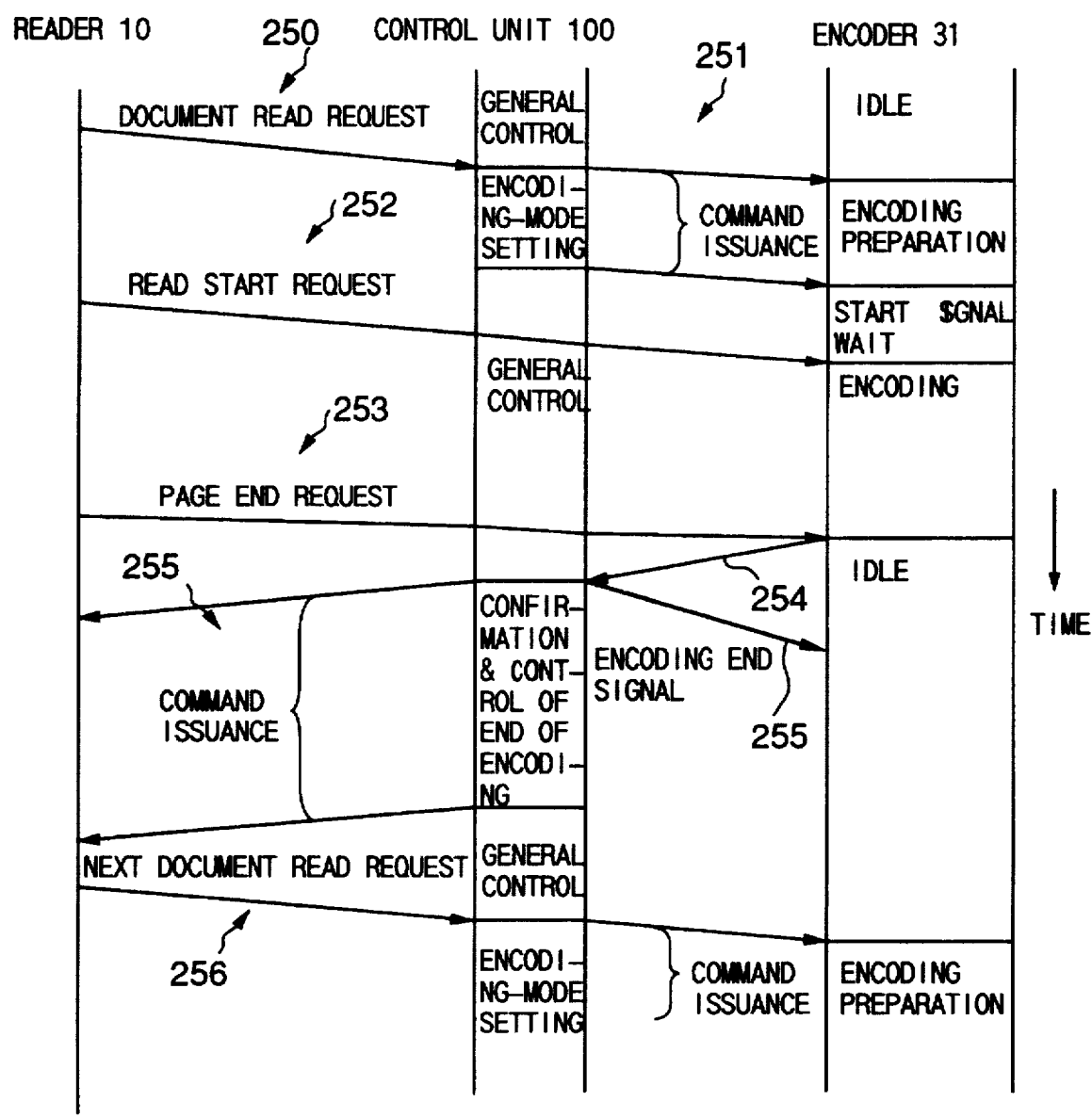
FIG. 11 is a diagram for explaining the time transition of processing between the system, control unit and encoder in an encoding mode.

The operation of the facsimile apparatus shown in FIG. 9 will be explained by referring to a flowchart of the control unit 100 as shown in FIG. 10 and also to a diagram showing a time transition of the processings between the system, control unit and encoder as shown in FIG. 11.

In the following explanation, the term 'page' as used in the present invention includes not only a page indicating a physical break in ordinary meaning but also a page divided by such a predetermined break as a previous mark or a featured paper shape. A unit page at the time of scanning/reading the document and printing the image data is determined by the amount of movement in the vertical direction (sub scanning direction), and the amount of movement as used herein means the size of an image determined by the amount of feed (feed out) in the document or print recording paper.

In FIG. 11, first of all, a document to be read is set in the reader 10. When a document read request signal 250 is sent from the reader 10 to the control unit 100 through the control bus 14, the control unit 100 sends an encoding mode set command 251 to the encoding processor 316 of the encoder 31 through the control bus 17. At this time, the encoder 31, when receiving the encoding mode set command 251, is put in its encoding preparation state and gets ready for the reception of a read start request signal 252 from the reader 10. Next, when the read start request signal 252 is applied through the control bus 18 to the encoder 31 directly without any intervention of the control unit 100, the encoder 31, as soon as it receives the read start request signal 252, is immediately put in its encoding processing state and starts its encoding operation for the image data obtained through the reading of the document and received from the reader 10 through the data line 22. The encoding state is kept until the encoder 31 receives a page end request signal 253 through the control bus 18 from the reader 10 directly without any intervention of the control unit 100.

The encoder 31, when receiving the page end request signal 253, is put in its idle state and at the same time, sends an encoding end signal 254 to the control unit 100 through the control bus 16. The control unit 100, when receiving the encoding end signal 254, confirms the end of the encoding operation and at the same time, sends a command 255 to the system to perform the control necessary for the end of the encoding. This necessary control refers to the inspection for the presence or absence of paper jamming which hinders the normal execution of the facsimile operation or the control of a reading motor for shifting the next document sheet to a predetermined position. If another document sheet is present, then the reader 10 issues a next document read request signal 256 to the control unit 100. Thereafter, such processings as mentioned above are again executed and will be continuously carried out until the reading of all the document sheets and the encoding operation of the read data are completed so long as the user does not give a processing interruption command in the course of the above operation.

In the case where the page is divided by such a predetermined break as a preset mark or a featured paper shape, when another reader or an additional processor for detecting such mark or features is provided, the processor can recognize the detected mark or feature as a division between pages to continue the similar processing to the above.

Shown in FIG. 10 is a flowchart for explaining the above operation under control of the control unit 100.

In general, in the case of a facsimile apparatus, the control unit 100 performs not only general control over the facsimile apparatus, that is, control of reading a document and recording image data, but performs also control of the image data to be transmitted through a communication system and data processing at a man-machine interface. First, control unit 100 in its wait state, when receiving a control request from the system starts its execution of the entire system controlling operation (step 230). At this time, in the entire system control operation, for performing suitable operations according to various sorts of such requests from the system, the control unit determines the type request received from the system as illustrated (step 230a). In this request determination, the processings of the document reading and image data recording are individually determined, while the other processings are determined together as a system request processing. After the determination of each request, the document reading and the execution or halt of the data encoding are determined in the following manner. First, a determination is made as to whether or not a document is present in the reader 10 (step 231). If so, then the control unit receives the document read request signal 250, performs its encoding-mode setting operation (step 232), sends the encoding-mode set command 251 to the encoder 31 through the control bus 17, and returns to its initial wait state. When deciding that a document is not present, the control unit immediately returns to the initial wait state. After the issuance of the command 251, it is judged whether or not the reading of the first page of the document set in the reader 10 is completed (step 233). The determination of the completion of the reading of the first page causes the control unit to perform confirmation of the end of the encoding operation and control necessary for the system (step 234) and to return to the initial wait state. The determination of no completion of the reading causes the control unit to immediately return to its initial wait state.

Figure 13:
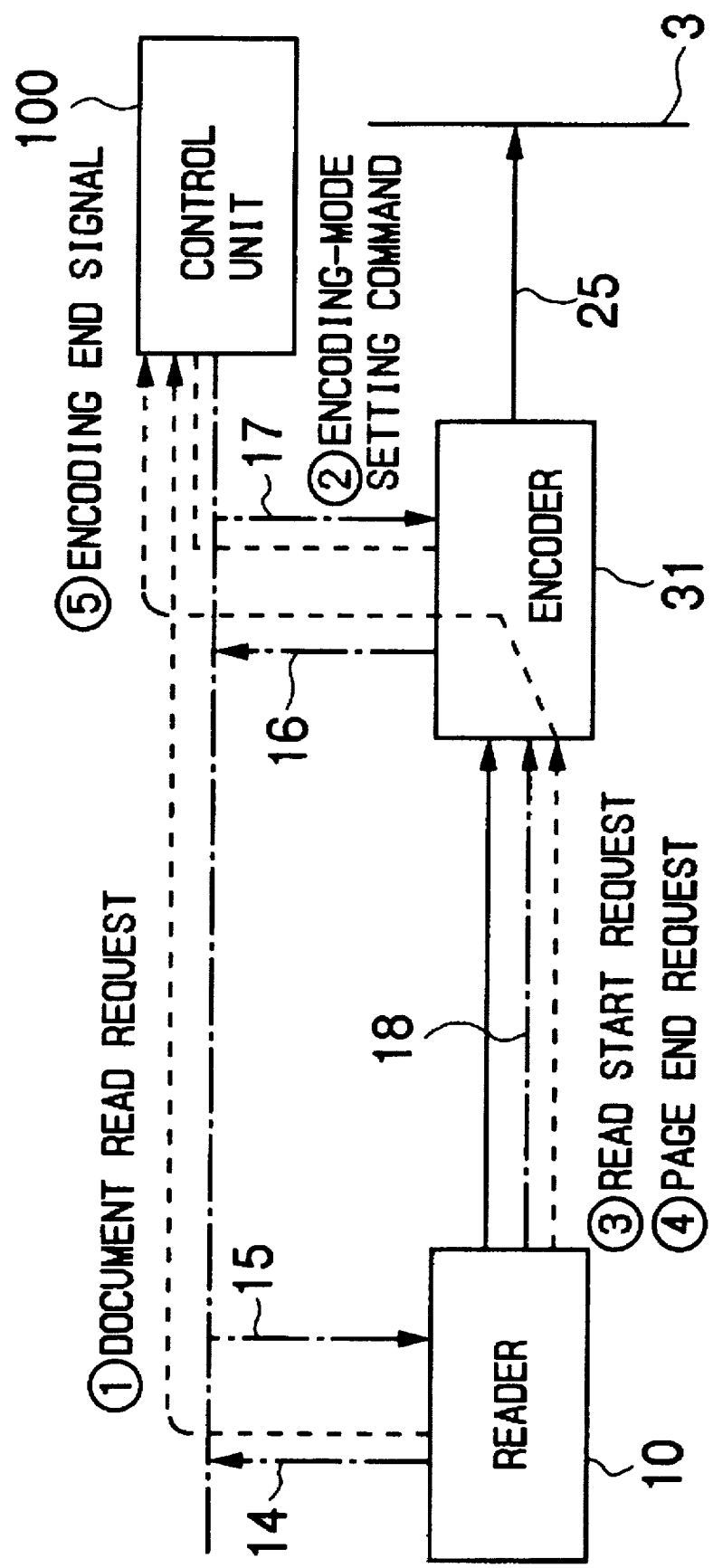
FIG. 13 shows the processing transition of FIG. 11 with time in the form of flow of control signals.

Referring to FIG. 13, there is shown a diagram for explaining the transmission paths and transmission sequence of various sorts of signal in such a series of operations as stated above, in which ① to ⑤ denote the transmission sequence.

In the drawing, ① a document is set in the reader 10 and when the document read request signal 250 is issued from the reader 10 to the control unit 100 through the control bus 14, the control unit 100 detects the document read request signal 250. ② The control unit 100, when detecting the document read request signal 250, issues the encoding-mode set command 251 to the encoder 31 through the control bus 17. ③ The encoder 31 is put in a state to wait for the reception of the read start request signal 252. The encoder 31, when receiving the read start request signal 252 from the reader 10 through the control bus 18, starts its encoding operation of the image data obtained through the reading of the document and received through the data line 22. After starting the encoding operation, the encoder 31 continues the encoding operation in the set encoding mode until it receives the page end request signal 253. ④ When the reading of the document corresponding to one page ends and the page end request signal 253 is sent to the encoder 31 from the reader 10 through the control bus 18, the encoder 31 stops the encoding operation. ⑤ At this stage, the encoder 31 issues the encoding end signal 254 to the control unit 100 through the control bus 16 and is put in its idle state. Thereafter, the control unit returns to its initial state and when there is another document to be read in the reader, the control unit repeats the aforementioned operations in the order of ① to ⑤.

As has been explained in the foregoing, with regard to the document reading and the encoding of the read image data, in the case where the control unit 100 monitors the reception of the document read request signal 250 from the reader 10 and when receiving the document read request signal 250, the control unit 100 issues the encoding-mode set command 251 to the encoder 31 for preparation of the encoding; thereafter the document reading and the encoding of the read image data can be independently carried out between only the reader 10 and the encoder 31 without the intervention of the control unit 100, during which the need for real time control of the control unit 100 can be eliminated. Further, even when the encoding operation of the read image data is completed, the control unit 100 monitors the reception of the encoding end signal 254 from the encoder 31 on an every page basis of the document and after the reception of the encoding end signal 254, the control unit 100 can execute suitable control of other data processings.

Figure 12:
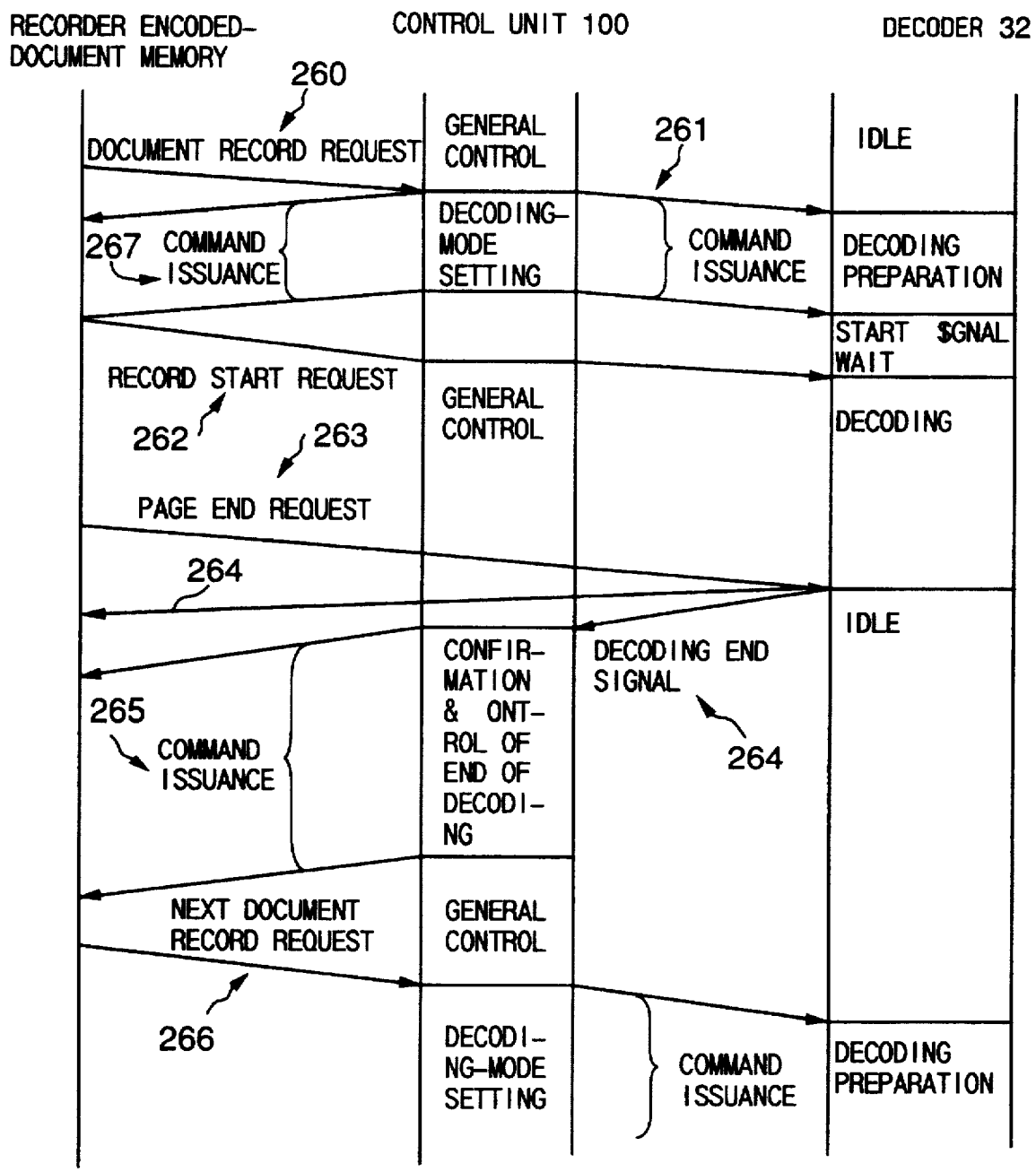
FIG. 12 is a diagram for explaining the time transition of processing between the system, control unit and decoder in a decoding mode.

Explanation will next be made as to the decoding of the encoded data and the operation of recording the decoded image data by referring to FIGS. 9, 10 and 12.

First, when the encoded-document memory 70 has an encoded document data to be recorded in the recorder 60, issuance of a document record request signal 260 from encoded-document memory 70 to the control unit 100 causes the control unit 100 to issue a record-mode set command 267 to the recorder 60 via the control bus 13 and also to issue a decoding-mode set command 261 to the decoding processor 326 of the decoder 32 through the control bus 17. At this time, the recorder 60 receiving the command 267 is put in its record ready state; while the decoder 32 receiving the command 261 is put in its decoding ready state to get ready for the reception of a record start request signal 262 from the recorder 60. In this case, when the record start request signal 262 is input to the decoder 32 through the control bus 21 directly from the recorder 60 without the intervention of the control unit 100, the decoder 32, immediately after receiving the record start request signal 262, is put in its decoding operation state to execute the decoding operation of the encoded data line 25. This decoding operation state is continued until a page end request signal 263 is input to the decoder 32 from the code transfer unit 110 or encoded-document memory 70 without the intervention of the control unit 100. The decoder 32, when receiving the page end request signal 263, is put in its idle state and issues a decoding end signal 264 to the control unit 100 through the control bus 16 and to the recorder 60 through the control bus 21. The control unit 100, when receiving the decoding end signal 264, confirms the end of the decoding operation and issues a command 265 to the system to perform the control necessary for the system.

Even in this case, the necessary control refers to the inspection for the presence or absence of paper jamming which hinders the normal execution of facsimile operation and if present, also the control of a recording motor for getting ready for recording the encoded document data to be next recorded. If the encoded document data to be next recorded is present, then the encoded-document memory 70 issues a next document record request signal 266 to the control unit 100. Thereafter, such processings as mentioned above are again executed and will be continuously carried out until all the encoded document data to be recorded becomes fully absent, so long as the user does not give a processing interruption command in the course of the above operation.

The flowchart of FIG. 10 carried out by the control unit 100 is substantially the same as the processing flowchart of reading the document and encoding the read data. More specifically, first, when the control unit 100 in its wait state receives a control request, the control unit causes the entire system control processing to be started and executed (step 230) and then determines the type of request from the system (step 230a). Even in this case, the decision for the execution or halt of decoding the encoded data and recording the decoded data is carried out in the following manner. First, it is determined whether or not encoded data to be recorded is present (step 235). The determination of the presence of encoded data causes the control unit, in response to the reception of the document record request signal 260, to perform its decoding mode set processing (step 236). At the same time, the control unit also sends the decoding-mode set command 261 to the decoder 32 through the control bus 17 and returns to its initial wait state. The detection of the absence of encoded data causes the control unit to quickly return to its initial wait state. After the output of the command 261 from the control unit, the control unit determines whether or not the recording of one page of document was completed in the recorder 60 (step 237). The determination that the completion of the recording of the one-page document has occurred causes the control unit to confirm the end of the decoding operation and also to perform the control necessary for the system (step 238) in its initial wait state. The determination that the recording is not yet completed causes the control unit to immediately return to its initial wait state.

Figure 14:
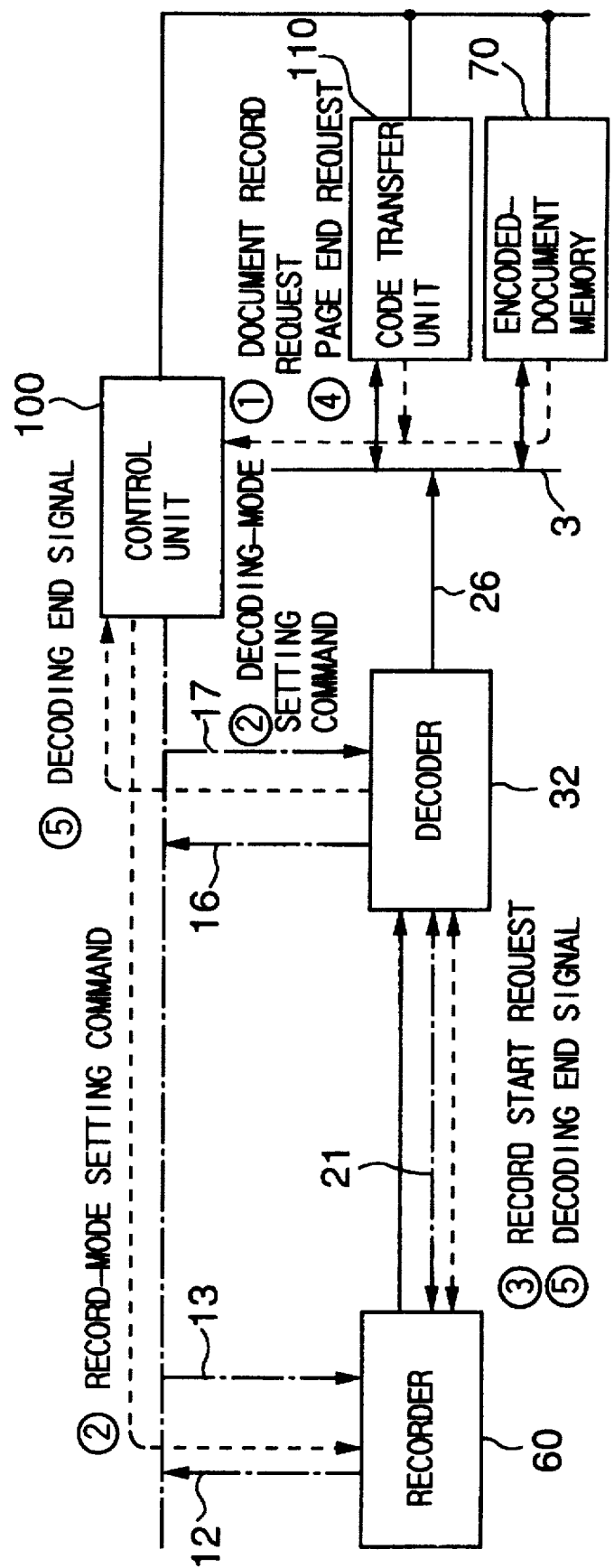
FIG. 14 shows the processing transition of FIG. 12 with time in the form of flow of control signals.

Referring to FIG. 14, there is shown a diagram for explaining the transmission paths and transmission sequence of various sorts of signals in such a series of operations as stated above, in which ① to ⑤ denote the transmission sequence.

In FIG. 14, ① when an encoded document data to be recorded in the encoded-document memory 70 is present and the document record request signal 260 is issued from the encoded-document memory 70 to the control unit 100, the control unit 100 detects the document record request signal 260. ② The control unit 100, when detecting the document record request signal 260, issues the decoding-mode set command to decoder 32 and the recording-mode set command 267 to the recorder 60 through the control bus 13. ③ The decoder 32 is put in a state to wait for the reception of the record start request signal 262. The decoder 32, when receiving the record start request signal 262 from the recorder 60 through the control bus 21, starts its decoding operation of the encoded data received through the data line 25. After starting the decoding operation, the decoder 32 continues the decoding operation in the set decoding mode until it receives the page end request signal 263. ④ When the sending of the encoded data corresponding to the one-page document is completed and the page end request signal 263 is sent to the decoder 32 from the encoded-document memory 70, the decoder 32 stops the decoding operation. ⑤ At this stage, the decoder 32 issues the decoding end signal 264 to the control unit 100 through the control bus 16 and to the recorder 60 through the control bus 21 and is put in its idle state. Thereafter, the control unit returns to its initial state and when there is another encoded document data to be recorded, the control unit repeats the aforementioned operations in the order of ① to ⑤.

As has been explained in the foregoing, with regard to the decoding of the encoded data and the recording of the decoded data, in the case where the control unit 100 monitors the reception of the document record request signal 260 from the encoded-document memory 70 and when receiving the document record request signal 260, the control unit 100 issues the decoding-mode set command 261 for preparation of the decoding and the record-mode set command 267 for preparation of the recording to the decoder 32 and the recorder 60; thereafter the decoding of the encoded data and the recording of the decoded data can be independently carried out between only the decoder 32 and the recorder 60 without the intervention of the control unit 100, during which the need for real time control of the control unit 100 can be eliminated. Further, even when the decoding of the encoded data and the recording of the decoded data are completed, as in the above case, the control unit 100 monitors the reception of the decoding end signal 264 from the decoder 32 on an every page basis of the document and after the reception of the decoding end signal 264, the control unit 100 can execute suitable control of other data processings.

Figure 15:
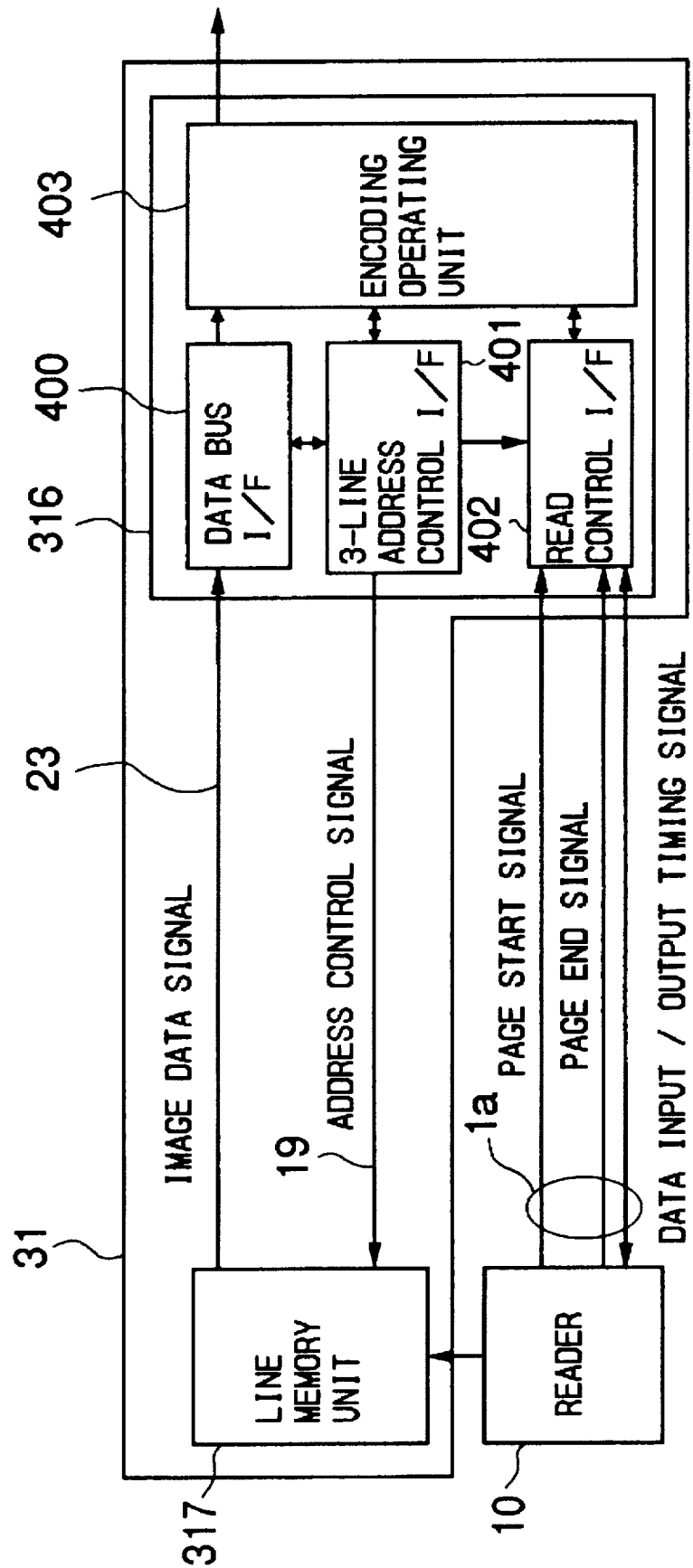
FIG. 15 shows a structure of the encoder as well as flow of control signals.

Explanation will now be made as to how to transfer control signals between the encoder 31 and reader 10 and between the line memory 317 and the encoding processor 316 by referring to FIG. 15.

In the drawing, a data bus interface (I/F) 400, a 3-line address control I/F 401, a read control I/F 402 and an encoding operating unit 403, which are connected in chain form, make up the encoding processor 316.

The read control I/F 402, which has a function of detecting the page start signal and the page end signal contained in the control signal transferred through the control bus 18, detects the page start signal and the page end signal, times the reading start and end of the document on an every page basis in synchronism with the reader 10 without any other control, controls a data input/output timing signal therein, and executes the reading of the document and the encoding of the read data. The 3-line address control I/F 401 and the data bus I/F 400 control the transfer of image data between the line memory 317 and the encoding processor 316, which will be explained below in detail.

In general, when it is desired to encode image data, the larger the number of transition points between white and black pixels is per unit length in the image data, the longer the time that is necessary for the encoding of the image data. And the reading of the image data is usually arranged to be effected at a constant rate. However, when a memory means is not provided between the reader 10 and the encoder 31, the reading of the image data at a constant rate requires the read data to be encoded in synchronism with the reading of the image data at the constant rate. Meanwhile, when it is desired to encode the image data at a constant rate, for the purpose of preventing an encoded image data signal from being generated when the encoding is delayed, it is usually arranged to suppress the input rate of the image data to the encoder 31, taking its safety into consideration.

Even in the case where a memory means is provided between the reader 10 and the encoder 31, when the rate of encoding the image data is set to be relatively slow, there is a danger that a line not yet subjected to an image data reading operation is encoded. To avoid this, it is necessary to add a function such that the line being encoded will not get ahead of the input line of the image data of the memory means.

In this connection, when the image data is stored in a memory such as a RAM on an every page basis of the document and after completion of the storage of the encoding is carried out, the need for such setting as to take the safety to the encoding time into consideration can be eliminated, and a high speed encoding can be achieved. However, this also uneconomically requires a very large capacity bit map page memory and a heavy memory management function.

In such a case, since the present invention is arranged to be able to cope with it, that is, since the aforementioned function is built in the encoding processor 316, the above can be achieved with a simple arrangement while preventing an increase in the processing load of an external control element.

In more detail, in accordance with the present invention, the 3-line address control I/F 401, having a pass-ahead prevention function of preventing the current line from getting ahead of the unset line of the image data, is provided within the encoding processor 316, and the encoding processor 316 and the line memory 317, corresponding to 3 lines, are provided within the encoder 31. The pass-ahead prevention function can be satisfactorily provided by a general method such as one of the following, for example: (1) providing an image data set completion flag for every line, (2) pre-setting line addresses based on the sheet size and reading density and positively providing a difference in the set address between the encoding line and the image data input line, or (3) providing a counter to positively provide a difference larger than a pre-set constant between the image data input line and the encoding line. In this case, the image data supplied from the reader 10 is sent to the line memory 317 under control of the 3-line address control I/F 401 to be temporarily stored in the line memory and then is sent through the data bus I/F 400 to the encoding operating unit 403 where the image data is subjected to an encoding operation and then is output therefrom as an encoded data.

As has been explained in the foregoing, in the case where the above arrangement is employed, addition of only a new memory management function corresponding to 3 lines to the encoder processor 316 eliminates the need for the addition of another heavy memory management function, whereby simplification of the hardware can be satisfactorily achieved.

Figure 16:
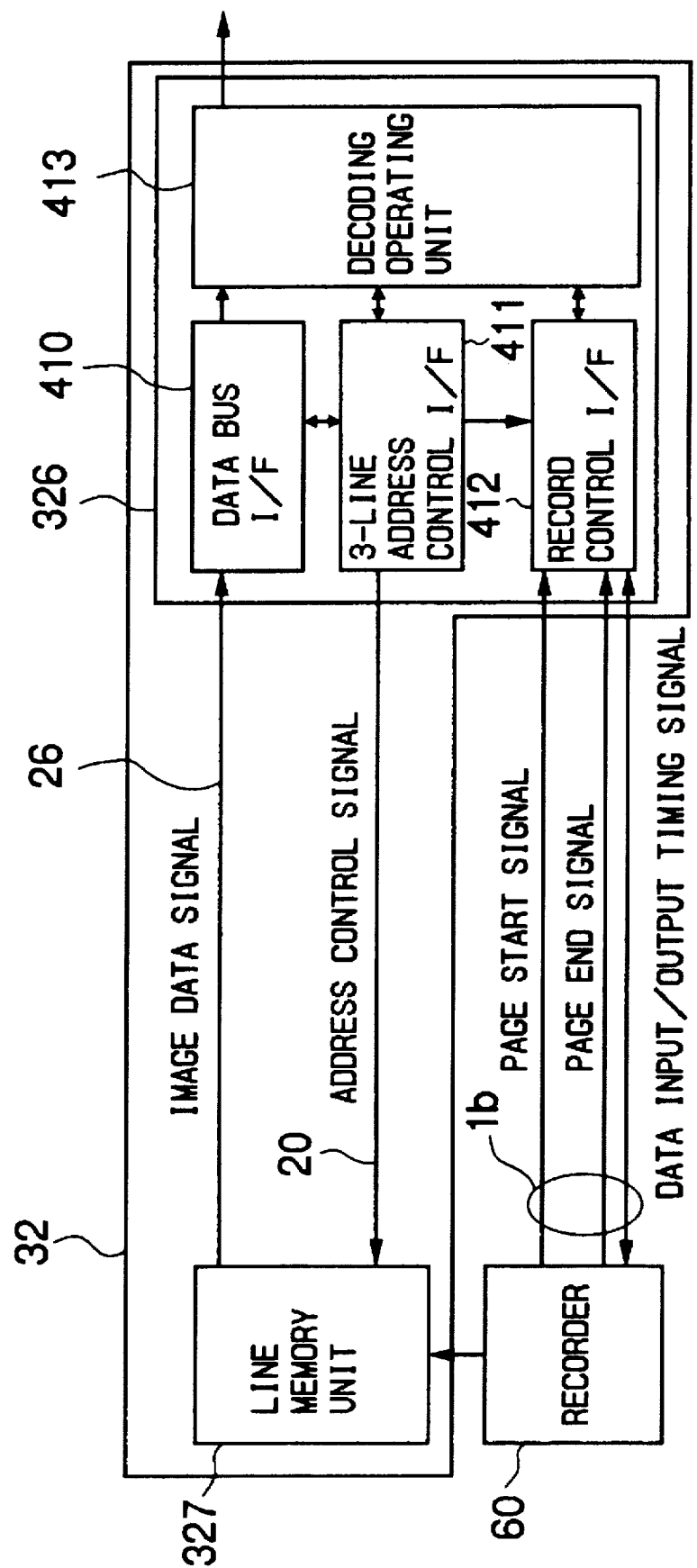
FIG. 16 shows a structure of the decoder as well as flow of control signals.

Explanation will next be made as to how to transfer control signals between the decoder 32 and recorder 60 and between the line memory 327 and the decoding processor 326 by referring to FIG. 16.

In the drawing, a data bus interface (I/F) 410, a 3-line address control I/F 411, a record control I/F 412 and a decoding operating unit 413, which are connected in a chain form, make up the encoding processor 326.

The record control I/F 412, which has a function of detecting the record page start signal and the record page end signal contained in the control signal transferred through the control bus 21, detects the record page start signal, outputs the record page end signal, times the recording start and end of the document on an every page basis in synchronism with the recorder 60 without any intervention of other control, controls a data input/output timing signal therein, and executes the decoding of the encoded data and the recording of the decoded data. The 3-line address control I/F 411 and the data bus I/F 410 control the transfer of image data between the line memory 327 and the decoding processor 326, which will be explained below in detail.

As in the case of the encoding, when it is desired to decode encoded data, the larger the number of transition points between white and black pixels is per unit length in the encoded data is, the lower is the rate at which the encoded data per unit time is decoded. And the recording of the decoded image data is usually arranged to be effected at a constant rate. However, when a memory means is not provided between the recorder 60 and the decoder 32, the recording of the image data at a constant rate requires the read data to be recorded in synchronism with the recording of the image data at the constant rate. Meanwhile, when it is desired to record the image data at a constant rate, for the purpose of preventing undecoded image data signal from being recorded when the decoding is delayed, it is usually arranged to suppress the recording rate of the image data, taking its safety into consideration.

Even in the case where a memory means is provided between the decoder 32 and the recorder 60, when the rate of decoding the encoded image data is set to be relatively high, there is a danger that the restored image data is again written on a line not yet output to the recorder 60, that is, a so-called overwrite generation occurs. To avoid this, it is necessary to add a function such that the line being decoded will not get ahead of the recording line of the image data in the memory means.

Even in this case, for the purpose of attaining the high-speed decoding of the encoded data, when the decoded image data is stored in a memory such as a RAM on an every page basis and after completion of the storage the recording is carried out, the need for such setting as to take the safety to the decoding time into consideration can be eliminated and high speed decoding can be achieved. However, this also uneconomically requires a very large capacity bit map page memory and also a heavy memory management function.

In such a case, since the present invention is arranged to be able to cope with it, that is, since the aforementioned function is built in the decoding processor 326, the above can be achieved with a simple arrangement while preventing an increase in the processing load of an external control element.

In more detail, in accordance with the present invention, the 3-line address control I/F 411, having a pass-ahead prevention function of preventing the recording of the decoded data from getting ahead of the decoded line, is provided within the decoding processor 326, and the decoding processor 326 and the line memory 327, corresponding to 3 lines, are provided within the decoder 32. The pass-ahead prevention function can be satisfactorily achieved by a general method such as those listed in connection with the aforementioned pass-ahead prevention function. Even in this case, the encoded data is decoded at the decoding operation unit 413, the decoded image data is sent to the line memory 327 through the data bus I/F 410 under control of the 3-line address control I/F 411 to be temporarily stored in the line memory and then read out therefrom and to the recorder 60 to be recorded thereat.

As has been explained in the foregoing, in the case where the above arrangement is employed, attention of only a new memory management function corresponding to 3 lines to be the decoder processor 326 eliminates the need for the addition of another heavy memory management function, whereby simplification of the hardware can be satisfactorily achieved.

The foregoing explanation has been made on the assumption that the encoding and the decoding can be carried out independently of each other. In this case, multi-operation, allowing simultaneous reading of a document and recording of the decoded data, can be attained, thus contributing greatly to improvement in its service. And the execution of the multioperation requires, due to the employment of time sharing, the complicated control and also the delay of the execution time. However, the multi-operation can provide such a very excellent advantage that the overall cost can be reduced.

Meanwhile, when the above multi-operation is not employed, the structures of the encoder 31 and decoder 32 can be simplified. For example, the line memories 317 and 327 can be replaced by a single line memory for their common use, or the data bus I/Fs 400 and 410 can be combined into a single bidirectional bus I/F. In addition, since the data input/output timing signals of the 3-line address control I/Fs 401 and 411, as well as the read control I/F 402 and the record control I/F 412, can be combined into a single one for their common use, a simpler arrangement can be utilized.

Although the above explanation has been made in connection with the case where the encoding/decoding system of the present invention is applied to a facsimile apparatus, the application of the encoding/decoding system of the invention is not limited to the specific facsimile apparatus but may be utilized for other types of machines.

Further, the encoder 31, decoder 32, control unit 100, reader 10, recorder 60, code transfer unit 110 and encoded-document memory 70 are arranged as separately provided in the foregoing explanation. However, the present invention is not restricted to such a separated arrangement, but these elements may be suitably combined so long as these combinations include the functions of the elements.

With respect to the structures of the encoder 31 and the decoder 32, in particular, the encoder 31 and the decoder 32 may be made in the form of a single large scaled integrated circuit (LSI) so that interconnection between the LSI and an external circuit is effected by means of pins led out from the LSI, or the encoder 31 and the decoder 32 may be built in a single board so that interconnection between the board and an external circuit is effected by means of pins let out from the board. In the case where such an LSI or board configuration is employed, however, it is necessary, in addition to the conventionally let-out pins, to provide a pin for input/output of the page end signal.

Furthermore, the medium for the document reading of the reader 10 and/or for the data recording of the recorder 60 is not limited merely to paper but may be another suitable medium such as a magnetic device or an optical file.

In addition, at least the decoder 32 and the recorder 60 may be made in the form of an integral printer.

As has been explained in the foregoing, in the encoding/decoding system of the present invention, the control unit 100 merely issues necessary commands to the predetermined devices prior to the start of the encoding or decoding operation on an every document page basis, and thereafter the encoder and the decoder execute respectively independently the document reading operation and the encoding operation of the read data as well as the decoding operation of the encoded data and the recording operation of the decoded data. As a result, the load of the present system can be made much smaller than that of the prior art system based on the control unit 100 managing control throughout the full duration.

And since the encoding/decoding system of the present invention eliminates the need for the transfer of control signals on a real time basis of the control unit 100 during the encoding or decoding operation, the encoding and decoding operations per se can be made faster than those of the prior art, and the document input/output operation can be made at a rate ten times higher than the document input/output rate of an ordinary G3 facsimile apparatus, to a great advantage.

Further, since the encoding/decoding system of the present invention requires no use of any bit map page memory, the signal processing of the associated part can be simplified, and thus the other signal processing can be made faster by a corresponding amount. Also, since the employment of such simplified signal processing enables a great reduction of the load on the control unit 100, the use of a processor or multiprocessor having a high processing performance is unnecessary, and high service can be achieved with a low cost, in spite of the fact that the control function is improved.

As a result, the present invention can advantageously offer such service as to remarkably reduce the user's wait time and/or as to improve a man-machine interface performance with a high cost performance.

Figure 17:
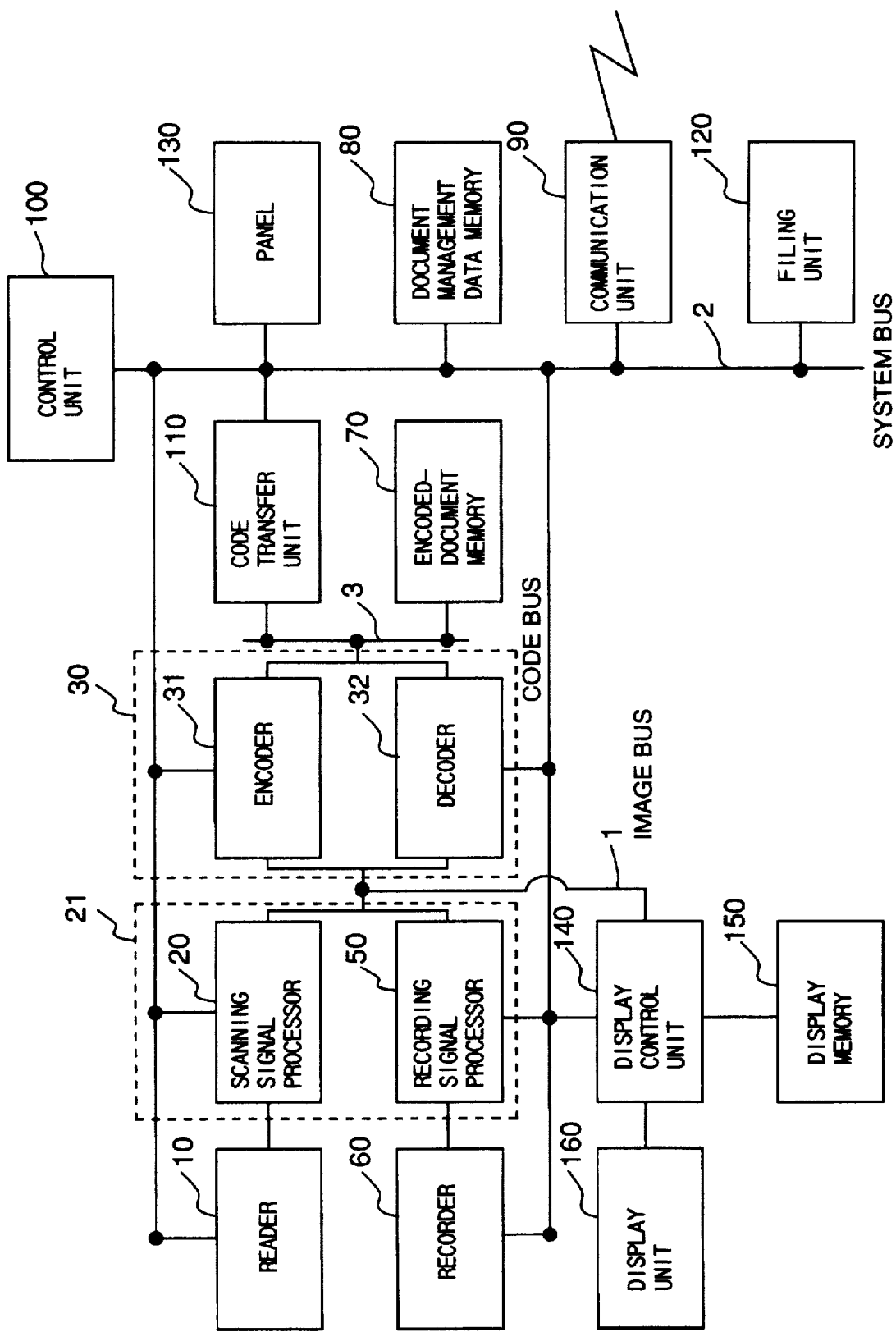
FIG. 17 is a block diagram of an arrangement of a facsimile apparatus in accordance with another embodiment of the present invention.

FIG. 17 is a block diagram of an arrangement of a facsimile apparatus in accordance with another embodiment of the present invention.

The present embodiment has substantially the same arrangement as the embodiment of FIG. 1, except that, in the present embodiment, an output of the scanning signal processor 20, and input of the recording signal processor 50, an input of the encoder 31 and an output of the decoder 32 are all connected to the single image bus 1.

In the operation of the present embodiment, an image signal is transferred from the scanning signal processor 20 to the encoder 31 through the image bus 1 while an image signal is transferred from the decoder 32 to the recording signal processor 50 through the image bus 1. The other operation is substantially the same as that of the embodiment of FIG. 1, and thus explanation thereof is omitted.

In the present embodiment, when the encoding and decoding operations are carried out, for example, when the reading operation and the recording operation are carried out at the same time, high-speed transfer of the two image signals is carried out on the single image bus 1. For this reason, the present embodiment disadvantageously requires the image bus having a higher rate than that of the embodiment of FIG. 1. However, in the case where the scanning signal processor 20 and the recording signal processor 50 are combined into a high-quality converter 21 as shown by a dotted line in the drawing and the high-quality converter 21 is made in the form of a large scaled integrated circuit (LSI), and/or in the case where the encoder 31 and the decoder 32 are combined into an encoder/decoder 30 as shown by a dotted line in the drawing and the encoder/decoder 30 is made in the form of an LSI, the present invention can advantageously reduce the necessary number of pins thereof.

Figure 18:
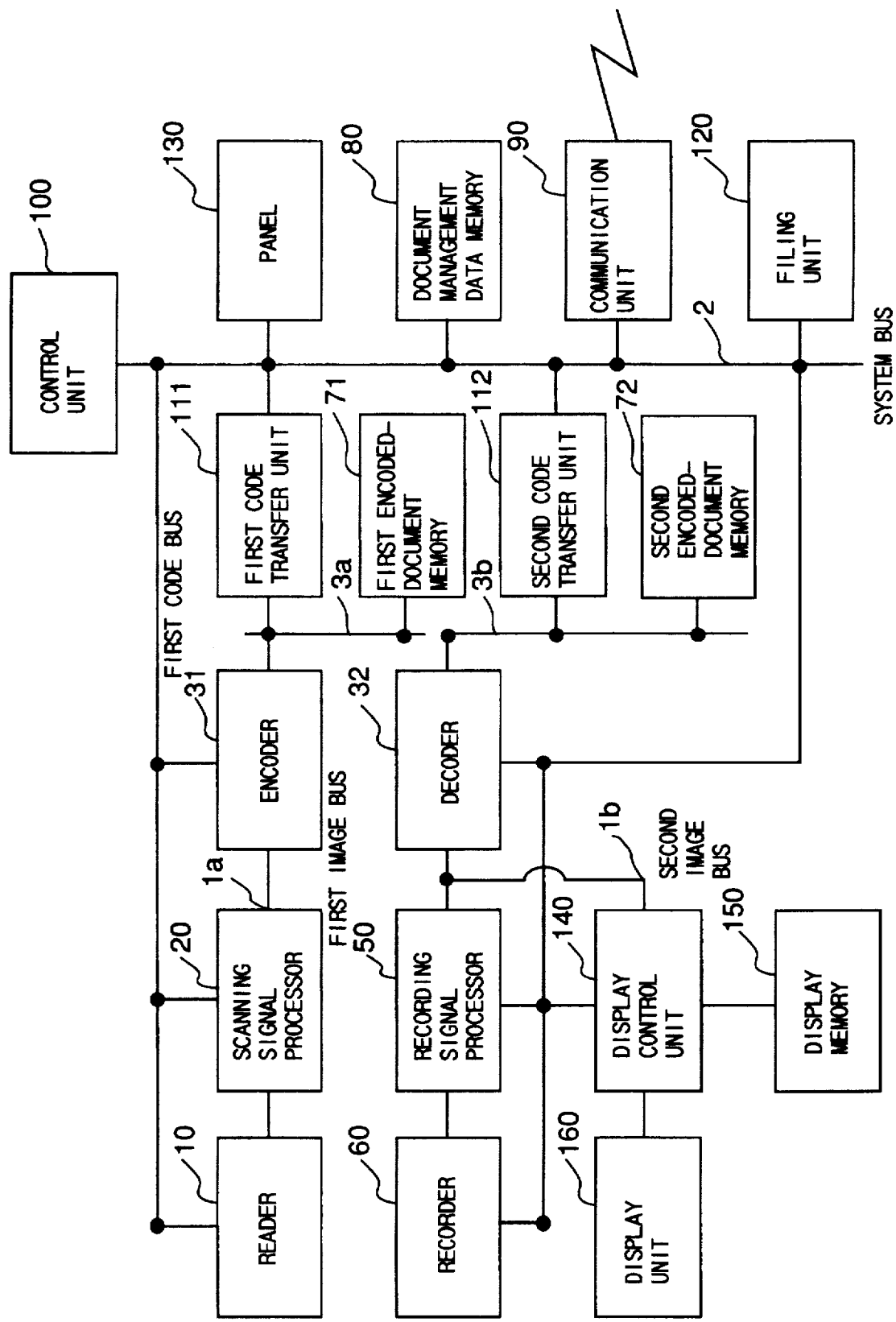
FIG. 18 is a block diagram of an arrangement of a facsimile apparatus in accordance with still another embodiment of the present invention.

Turning next to FIG. 18, there is shown a block diagram of an arrangement of a facsimile apparatus in accordance with still another embodiment of the present invention.

The present embodiment has substantially the same arrangement as the embodiment of FIG. 1, except that, in the present embodiment, first and second code buses 3a and 3b are provided, first and second encoded-document memories 71 and 72 and first and second code transfer units 111 and 112 are provided, an output of the encoder 31 is connected to the first code bus 3a, an input of the decoder 32 is connected to the second code bus 3, the first encoded-document memory 71 and the first code transfer unit 111 are connected to the first code bus 3a, and the second encoded-document memory 72 and the second code transfer unit 112 are connected to the second code bus 3b.

In the operation of the present embodiment, an encoded signal (document) is transferred from the encoder 31 to the first encoded-document memory 71 through the first code bus 3a, while an encoded signal (document) is transferred from the first encoded-document memory 71 to the communication unit 90 or filing unit 120 through the first code bus 3a and the system bus 2. Further, the second code transfer unit 112 transfers the encoded signal from the communication unit 90 or filing unit 120 to the second encoded-document memory 72 through the system bus 2 and the second code bus 3b; and the encoded signal is transferred from the second encoded-document memory 72 to the decoder 32 through the second code bus 3b. The above operation is different from the operation of the embodiment of FIG. 1, and the remaining operation is substantially the same as that of the embodiment of FIG. 1, and thus additional explanation thereof is omitted.

In the present embodiment, the code bus comprises the first encoding code bus 3a and decoding second code bus 3b which are separated. Therefore, in the case where two encoding and decoding operations are carried out, for example, in the case where the reading operation and the recording operation are carried out at the same time, the present embodiment is advantageous over the embodiment of FIG. 1, which has its code bus 3 not separated, in that the loads of the code buses 3a and 3b can be made small, and thus higher-speed processing can be attained by a corresponding amount.

Figure 19:
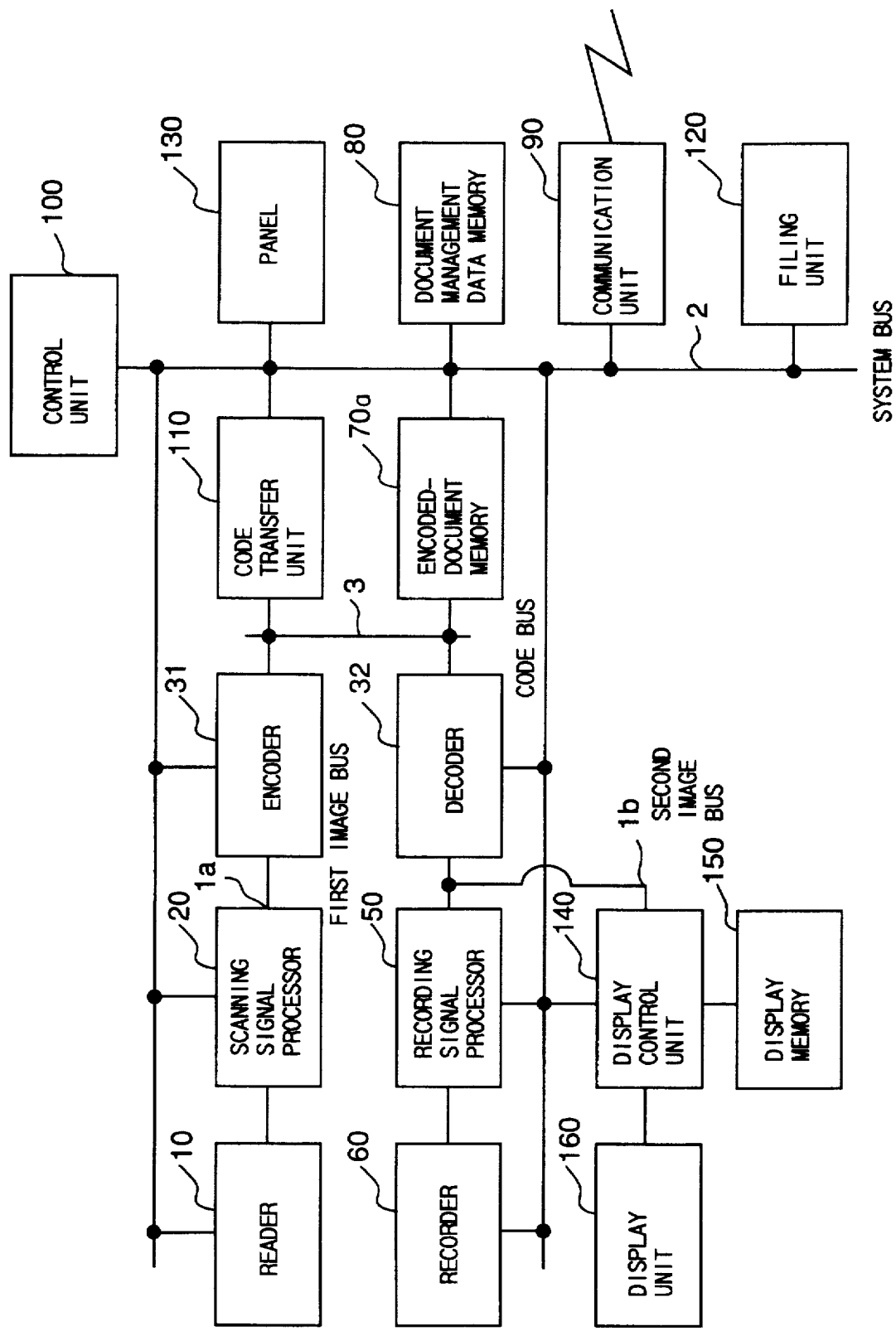
FIG. 19 is a block diagram of an arrangement of a facsimile apparatus in accordance with a further embodiment of the present invention.

Shown in FIG. 19 is a block diagram of an arrangement of a facsimile apparatus in accordance with a further embodiment of the present invention.

The present embodiment has substantially the same arrangement as the embodiment of FIG. 1, except that, in the present embodiment, the encoded-document memory 70a comprises a dual port RAM one port of which is connected to the code bus 3 and the other port of which is connected to the system bus 2 so that accessing can be attained from both the code bus 3 and the system bus 2.

In the operation of the present embodiment, the code transfer unit 110 transfers an encoded signal (document) between the communication unit 90 or filing unit 120 and the encoded-document memory 70a directly from the system bus 2 without any intervention of the code transfer unit 110. For this reason, the encoded signal does not flow through the code bus 3 in the transmitting operation, in the filing operation, in the receiving operation and in the file reading operation. Accordingly, in the case where the code bus 3 is used in any of the above operations, for example, in the case where the reading operation is carried out simultaneously with one of the above operations, the present embodiment has an effect that the load on the code bus 3 can be made considerably small, and thus higher speed processing can be achieved by a corresponding amount.

Figure 20:
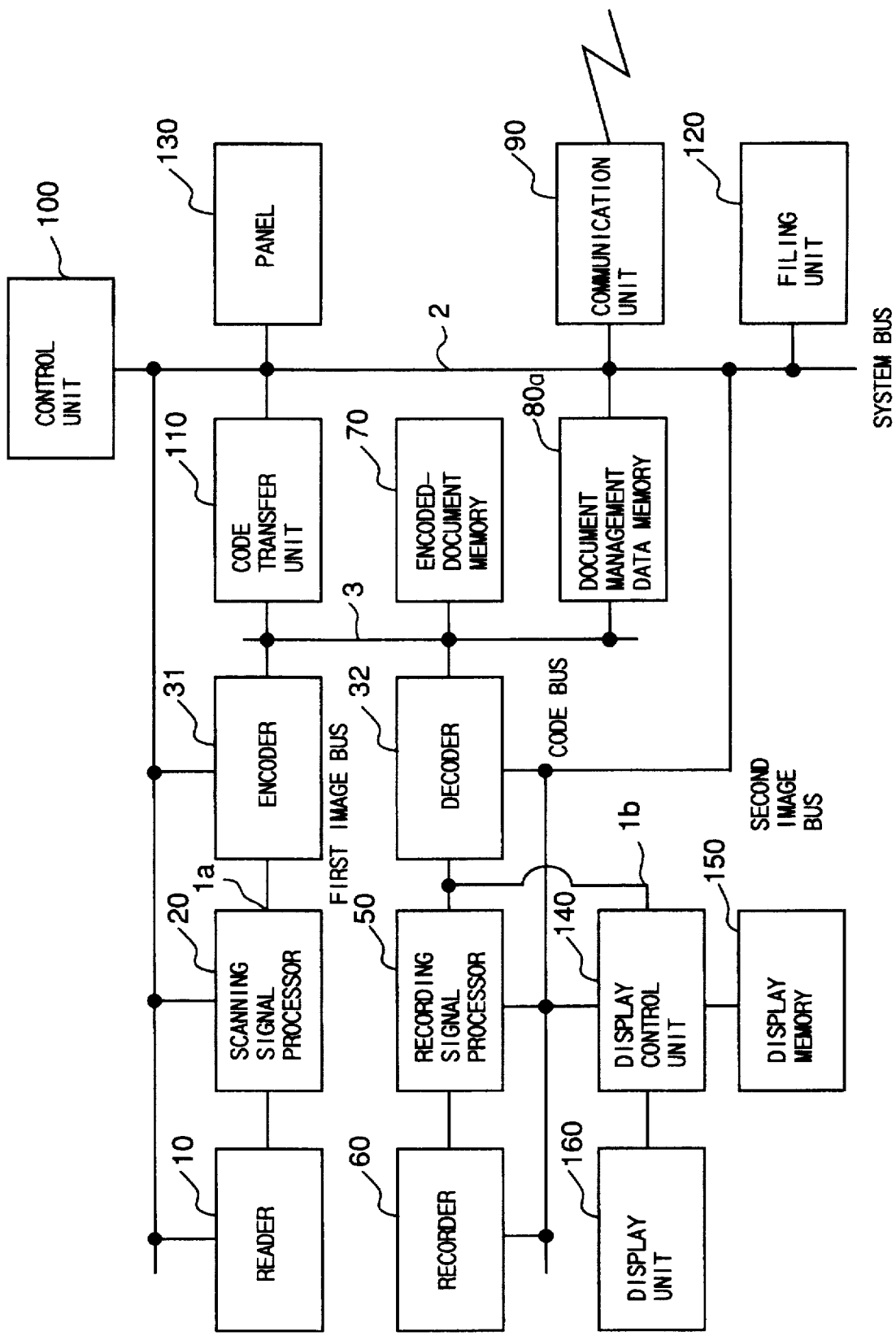
FIG. 20 is a block diagram of an arrangement of a facsimile apparatus in accordance with yet a still further embodiment of the present invention.

FIG. 20 is a block diagram of an arrangement of a facsimile apparatus in accordance with a still further embodiment of the present invention.

The present embodiment has substantially the same arrangement as the embodiment of FIG. 1, except that, in the present embodiment, the document management data memory 80a comprises a dual port RAM one port of which is connected to the code bus 3 and the other port of which is connected to the system bus 2 so that accessing can be attained from both the code bus 3 and the system bus 2.

In the operation of the present embodiment, the code transfer unit 110 receives a transfer destination address of the encoded signal of the encoded-document memory 70 from the document management data memory 80 through the code bus 3 and executes the transfer of the encoded signal. For example, when it is desired to transfer the encoded signal from the encoder 31 to the encoded-document memory 70, the code transfer unit 110 gets through the code bus 3 the transfer destination address of the encoded signal previously set in the document management data memory 80a through the system bus 2 and executes the transfer of the encoded signal to the address. In this case, when it is desired to transfer 64K bytes of the coded signal corresponding to one page to a plurality of memory blocks each having a storage capacity of 8K bytes, the transfer must be made to 8 such memory blocks. However, when heading addresses of the respective memory blocks are previously set in the document management data memory 80a prior to the reading start of the control unit 100, the code transfer unit 110 sequentially gets the transfer destination addresses of the memory blocks from the document management data memory 80a through the code bus 3 and executes the transfer of the encoded signal. For this reason, it becomes unnecessary for the control unit 100 to set the transfer destination address to the code transfer unit 110 during the reading operation. Thus, the present embodiment can have an effect that the load on the control unit 100 can be made light during the reading operation, and the reading operation can be achieved at a high speed. Likewise in the recording operation, the similar effect can be obtained.

Figure 21:
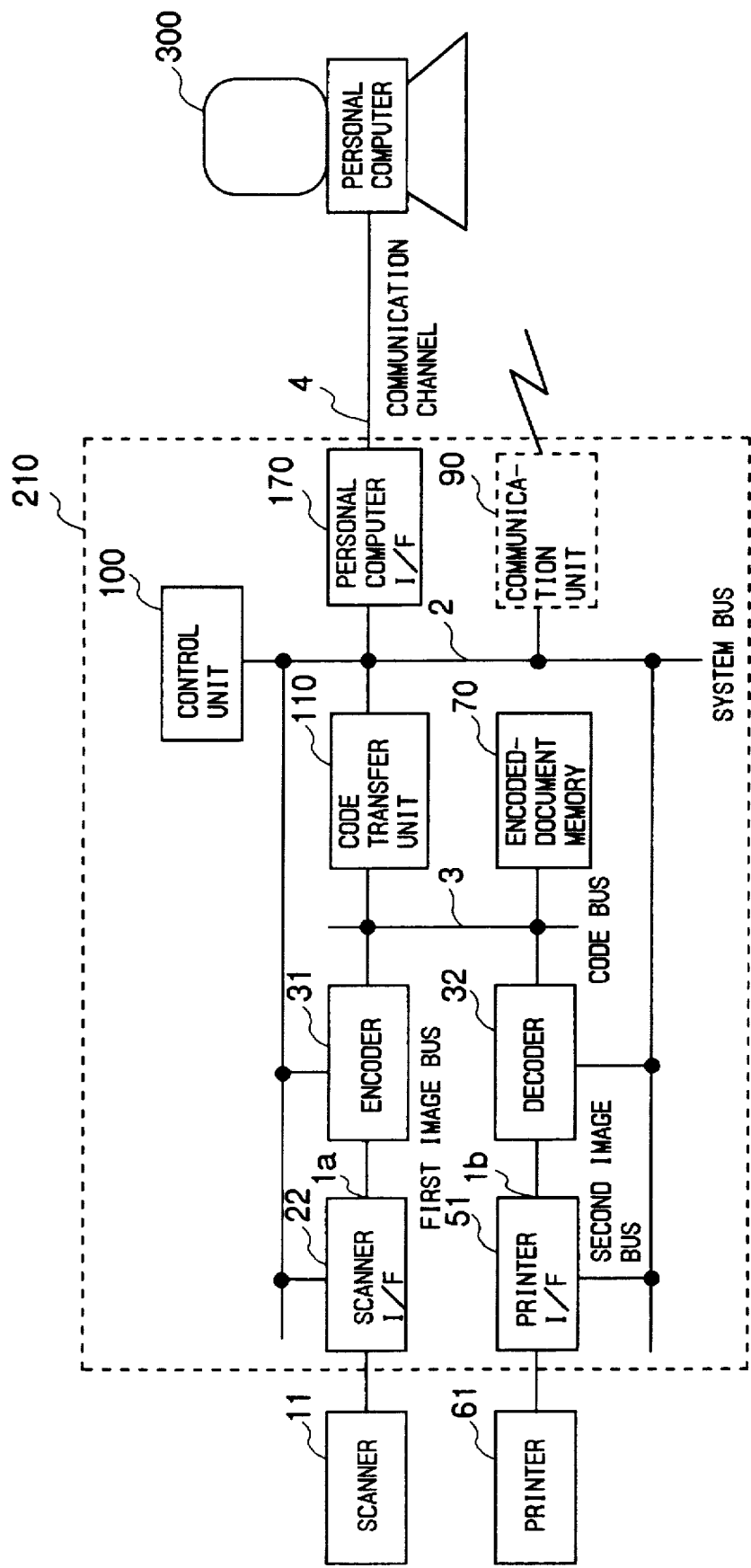
FIG. 21 is a block diagram of an arrangement of a facsimile apparatus in accordance with another embodiment of the present invention.

Referring next to FIG. 21, there is shown a block diagram of an arrangement of a facsimile apparatus in accordance with another embodiment of the present invention.

The present embodiment has substantially the same arrangement as the embodiment of FIG. 1, except that, in the present embodiment, the reader 10 and scanning signal processor 20 in the embodiment of FIG. 1 are replaced by a scanner 11 and a scanner interface (I/F) 22, the recording signal processor 40 and recorder 60 of the embodiment of FIG. 1 are replaced respectively by a printer I/F 51 and a printer 61, and the document data memory 80, communication unit 90 (which is not present in the present embodiment and thus is shown by a broken line), filing unit 120 and panel 130 of the embodiment of FIG. 1 are replaced by a personal computer I/F 170 and a personal computer 300.

And the scanner 11 scans a document and outputs an image signal, while the scanner I/F 22 inputs and outputs the image signal and control signals. The printer 61 records the image signal and the printer I/F 51 performs input/output operation of the image signal and control signals. Further, the personal computer 300 performs communication and filing operations with an external device. The personal computer I/F 170 is configured based on a DPRAM (Dual Ports RAM), a LAN, an RS232C or other system. In the case where the DPRAM system is employed, a communication channel 4 comprises a bus within the personal computer.

The present embodiment basically performs two operations which follow.

① Scanner input

First, when a scanner input command is sent from the personal computer 300 through the personal computer I/F 170, the control unit 100 receives the command and issues a processing command to the scanner 11 through the scanner I/F 22. Then, the scanner 11, when receiving the processing command, scans the document and outputs an image signal. The image signal obtained from the scanner 11 is input to the encoder 31 through the scanner I/F 22, and the encoder 31 encodes the received image signal and transfers an encoded signal (document) to the encoded-document memory 70 through the code bus 3 to be accumulated in the memory. The accumulated coded signal is read out from the encoded-document memory 70 under control of the code transfer unit 110 and sent to the personal computer I/F 170 which in turn transfers the received encoded signal to the personal computer 300.

② Printer recording

First, when a printer recording command is sent from the personal computer 300 through the personal computer I/F 170, the control unit 100 receives the command and issues a transfer command to the code transfer unit 110. The code transfer unit 110, when responding to the transfer command, transfers to the encoded-document memory 70 via the code bus 3 the coded signal received from the personal computer 300 through the personal computer I/F 170 to accumulate the signal in the encoded-document memory 70. And when the accumulation of the encoded signal corresponding to one page or one document in the encoded-document memory 70 is completed, the control unit 100 issues a recording command through the printer I/F 51. Also, the decoder 32 receives and decodes the encoded signal to be recorded from the encoded-document memory 70 into a decoded image signal and issues the decoded image signal through the printer I/F 51 in conformity with the rate of the printer 61.

Since the encoded-document memory 70, which is capable of storing therein the encoded signal corresponding to one or more pages, is connected to the code bus 3, different from the bus of the personal computer 300, the present embodiment has an effect that reading and recording operations at a high and constant speed can be carried out without using any bit map page memory, while not imposing a load on the personal computer 300.

In the embodiment of FIG. 21, the communication unit 90 as shown by a broken line may be connected directly to the system bus for data communication.

In this case, the scanner input operation and printer recording operation are substantially the same as the scanner input operation ① the printer recording operation ② of the embodiment of FIG. 21. In addition, the following operations can be performed.

① Scanner transmission

This operation is achieved by encoding the image signal obtained from the scanner 11 and then by transmitting it with use of the communication unit 90. This operation is substantially the same as the earlier-mentioned facsimile transmission ① of the embodiment of FIG. 1, except that a scanner transmission command is received from the personal computer 300 to start the above operation, and thus additional detailed explanation thereof is omitted.

② Personal computer transmission

This operation is achieved by transmitting from the communication unit 90 the encoded signal received from a filing unit (not shown) provided within the personal computer 300 through the personal computer I/F 170. This operation includes two first and second operations which follow.

In the first operation, the encoded signal received through the personal computer I/F 170 is transferred directly to the communication unit 90 for transmission. This is valid when the transmission rate of the communication line is lower than the transmission rate of the personal computer I/F 170.

In the second operation, the encoded signal received through the personal computer I/F 170 is transferred to the encoded-document memory 70 to be temporarily stored therein, and then the transmission ② already explained in connection with the embodiment of FIG. 1 is carried out. This is valid when the transmission rate of the communication line is higher than the transmission rate of the personal computer I/F 170.

③ Personal computer reception

This operation is achieved by transferring the encoded signal received at the communication unit 90 to the filing unit 120 provided within the personal computer 300. This operation also includes two first and second operations which follow.

In the first operation, the encoded signal received at the communication unit 90 is transferred directly to the personal computer 300 through the personal computer I/F 170 to be filed at the personal computer. This is valid when the transmission rate of the communication line is lower than that of the personal computer I/F 170.

In the second operation, the encoded signal received at the communication unit 90 is transferred to the encoded-document memory 70 to be temporarily stored therein (which operation is the same as in the earlier-mentioned reception ④ of the embodiment of FIG. 1), while the encoded signal accumulated in the encoded-document memory 70 is transferred through the personal computer I/F 170 to the personal computer 300 to be filed thereat. This is valid when the transmission rate of the communication line is higher than that of the personal computer I/F 170.

In the present embodiment, even when the transmission rate of the encoded signal of the personal computer I/F 170 is slower than that of the communication line, transmission communication can be advantageously achieved with the communication channel 100% utilized.

Figure 22:
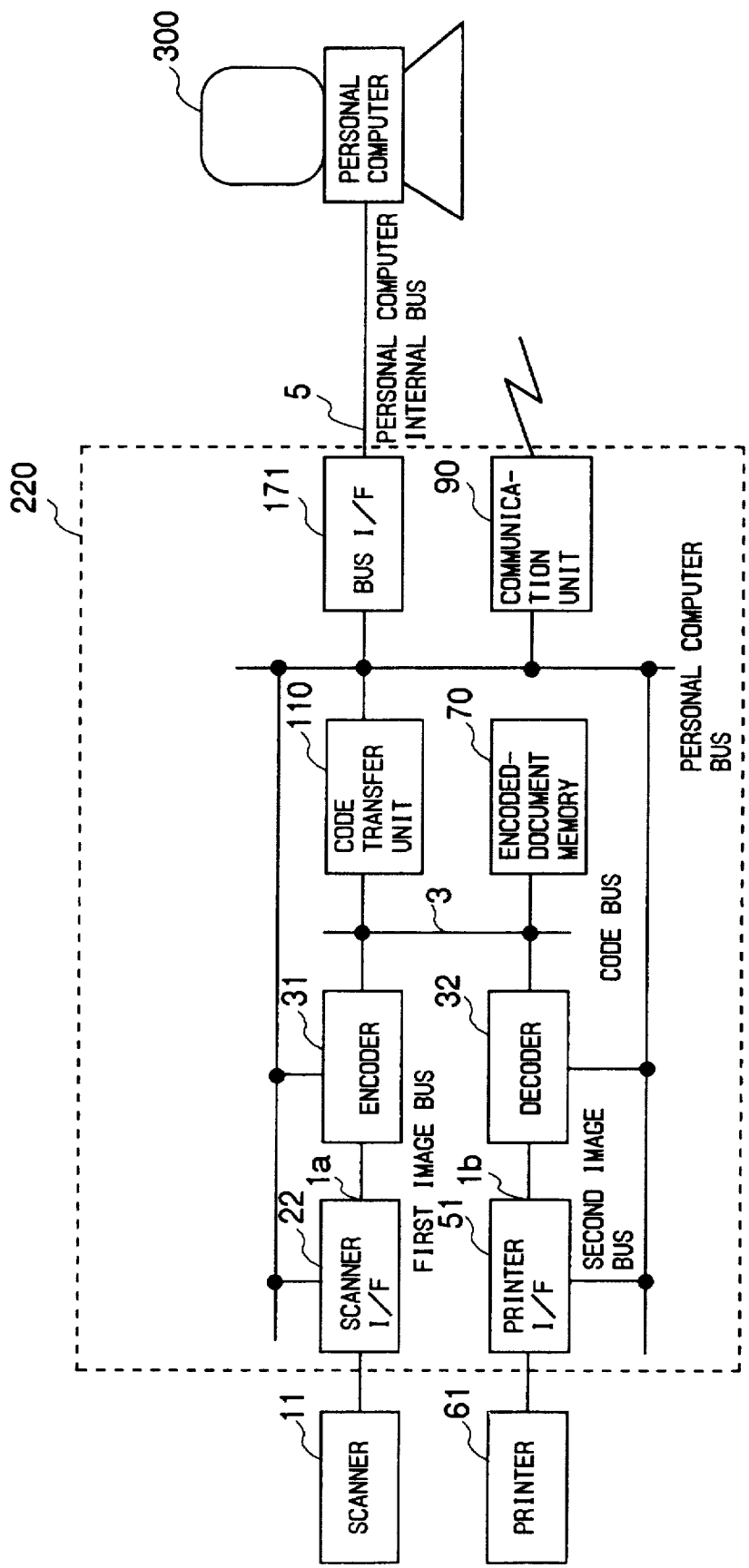
FIG. 22 is a block diagram of an arrangement of a facsimile apparatus in accordance with a further embodiment of the present invention.

Shown in FIG. 22 is a block diagram of an arrangement of a facsimile apparatus in accordance with an eighth embodiment of the present invention.

The present embodiment has substantially the same arrangement as the embodiment of FIG. 21, except that the control unit 100 is removed, the system bus 2 of FIG. 21 is changed to a personal computer bus, and the personal computer I/F 170 of FIG. 21 is changed to a bus I/F 171.

The operation of the present embodiment is substantially the same as that of the embodiment of FIG. 21, except that the personal computer 300 directly controls its personal computer bus through the bus I/F 171, and thus additional detailed explanation thereof is omitted.

In the present embodiment, since the use of the personal computer 300 for control purposes permits the control unit 100 to be eliminated, the system 220 can be advantageously arranged to be inexpensive and small in size.

In accordance with the embodiments of the present invention, at least one code bus 3 is provided separately from the system bus (personal computer bus) 2, at least one encoded-document memory 70 capable of storing the encoded signal corresponding to one or more pages is connected to the code bus 3, and the encoded signal of one or more pages are input and output at a high speed between the encoder 31/decoder 32 and the encoded-document memory 70. As a result, there can be provided a system for encoding a read image signal and/or a system for decoding the encoded signal into an image signal and recording the image signal, in which a document is read at a high and constant rate and encoded into an encoded signal without using any bit map page memory, and/or the encoded signal is decoded to be recorded at a high and constant rate.

Since the use of the code bus 3 and encoded-document memory 70 causes the encoded signal not to flow through the system bus (personal computer bus) 2 at all times, the load of the system bus 2 can be lightened considerably, and the entire system throughput can be made high, to advantage.

We claim:

1. A high-speed image signal processing system comprising:

a control unit (100) for controlling said image signal processing system;

input means (10, 20) for providing an image signal;

encoding means (31) for encoding said image signal and outputting an encoded signal;

memory means (70) for storing said encoded signal;

code transfer means (110) for transferring said encoded signal into and out from said memory means;

an image bus (1a);

a code bus (3); and a system bus (2), wherein:

an output port of said input means and an input port of said encoding means are connected to said image bus to transfer said image signal from said input means to said encoding means through said image bus;

an output port of said encoding means and said memory means are connected to said code bus to transfer said encoded signal from said encoding means to said memory means through said code bus;

said code transfer means has a first port connected to said code bus and a second port connected to said system bus to read out said encoded signal from said memory means and output the read out encoded signal to said system bus; and said control unit is connected to said system bus to control read out of said encoded signal from said memory means through said code transfer means.

2. A high-speed image signal processing system comprising:

a control unit (100) for controlling said image signal processing system;

memory means (70) for storing an encoded signal obtained through an encoding operation on an image signal;

code transfer means (110) for transferring said encoded signal into and out from said memory means;

decoding means 32) for decoding said encoded signal into said image signal and for outputting said decoded image signal;

output means (50, 60, 140, 160) for providing said decoded image signal as an image;

an image bus (1b);

a code bus (3); and a system bus (2), wherein:

said control unit and a first port of said code transfer means are connected to said system bus, said control unit controlling outputting of the encoded signal to said code transfer means through said system bus;

a second port of said code transfer means, said memory means and an input port of said decoding means are connected to said code bus to input said encoded signal from said memory means to said decoding means through said code bus; and an input port of said output means and an output port of said decoding means are connected to said image bus to transfer said decoded image signal from said decoding means to said output means through said image bus.

3. A high-speed image signal processing system comprising:

a control unit (100) for controlling said image signal processing system;

input means (10, 20) for providing an image signal;

encoding means (31) for encoding said image signal and outputting an encoded signal;

memory means (70) for storing said encoded signal;

code transfer means (110) for transferring said encoded signal into and out from said memory means;

decoding means (32) for decoding said encoded signal into said image signal and for outputting said decoded image signal;

output means (50, 60, 140, 160) for providing said decoded image signal as an image;

image bus means (1a, 1b);

a code bus (3); and a system bus (2);

wherein:

an output port of said input means and an input port of said encoding means are connected to said image bus means to transfer said image signal from said input means to said encoding means through said image bus means;

an output port of said encoding means and said memory means are connected to said code bus to transfer said encoded signal from said encoding means to said memory means through said code bus;

said code transfer means has a first port connected to said code bus to read out said encoded signal from said memory means and a second port connected to said system bus to [read out said encoded signal from said memory means and] output the read-out encoded signal to said system bus;

said control unit is connected to said system bus to control input of said encoded signal into said memory means and read out of said encoded signal from said memory means;

an input port of said decoding means is connected to said code bus to input said encoded signal from said memory means through said code bus to said decoding means; and an input port of said output means and an output port of said decoding means are connected to said image bus means to transfer said decoded image signal from said decoding means to said output means through said image bus means.

4. A high-speed image signal processing system comprising:

a control unit (100) for controlling said image signal processing system;

input means (10, 20) for providing a first image signal;

encoding means (31) for encoding said first image signal and outputting a first encoded signal;

memory means (70) for storing encoded signals;

code transfer means (110) for transferring encoded signals into and out from said memory means;

communication means (90) for transmitting the first encoded signal and receiving a second encoded signal;

decoding means (32) for decoding said second encoded signal into a second image signal and for outputting said second image signal;

output means (50, 60, 140, 160) for providing said second image signal as an image;

image bus means (1a, 1b);

code bus means (3a, 3b); and a system bus (2);

wherein:

an output port of said input means and an input port of said encoding means are connected to said image bus means to transfer said first image signal from said input means to said encoding means through said image bus means;

an output port of said encoding means and said memory means are connected to said code bus means to transfer said first encoded signal from said encoding means to said memory means through said code bus means;

said code transfer means has a first port connected to said code bus means and a second port connected to said system bus to transfer said first and second encoded signals into and out from said memory means;

said communication means is connected to said system bus to transmit said first encoded signal and receive said second encoded signal;

said code transfer means receives said second encoded signal from said communication means through said system bus and transfers said second encoded signal to said memory means through said code bus means;

an input port of said decoding means is connected to said code bus means to decode said second encoded signal from said memory means into said second image signal;

an input port of said output means and an output port of said decoding means are connected to said image bus means to transfer said second image signal from said decoding means to said output means through said image bus means; and said control unit is connected to said system bus to control said high-speed image processing system.

5. A high-speed image signal processing system as set forth in claim 4, wherein said image bus means comprises:

a first image bus member connected to said input means and said encoding means; and a second image bus member connected to said decoding means and said output means.

6. A high-speed image signal processing system as set forth in claim 4, wherein said communication means includes interface means, and a computer connected to said system bus through said interface means.

7. A high-speed image signal processing system as set forth in claim 4, further comprising interface means, and a computer connected to said interface means through said system bus.

8. A high-speed image signal processing system as set forth in claim 4, further comprising interface means connecting said system bus to an internal bus of a computer.

9. A high-speed image signal processing system as set forth in claim 1, wherein said encoding means includes three line memories, a first one of said line memories adapted to receive said image signal from said reading means, a second one of said line memories adapted to hold reference image data, and a third one of said line memories adapted to hold image data to be encoded, the receiving and holding operations being carried out at an identical time point.

10. A high-speed image signal processing system as set forth in claim 2, wherein said decoding means includes three line memories, a first one of said line memories adapted to send said image signal to said output means, a second one of said line memories adapted to hold reference image data, and a third one of said line memories adapted to hold image data to be generated by decoding encoded data, the sending and holding operations being carried out at an identical time point.

11. A high-speed image signal processing system as set forth in claim 4, wherein:

said memory means comprises a first memory unit for storing said first encoded signal, and a second memory unit for storing said second encoded signal;

said code transfer means comprises a first code transfer unit for transferring said first encoded signal into and out from said first memory unit, and a second code transfer unit for transferring said second encoded signal into and out from said second memory unit; and said code bus comprises a first code bus member connected to said encoding means, said first code transfer unit, and said first memory unit, and a second code bus member connected to said decoding means, said second code transfer unit, and said second memory unit.

12. A high-speed image signal processing system as set forth in claim 1, wherein said memory means has a first port connected to said code bus and a second port, independent of said first port of said memory means, connected to said system bus.

13. A high-speed image signal processing system as set forth in claim 1, further comprising management data memory means connected to said system bus, for storing management data for the encoded signal, and wherein said control unit manages said encoded signal on the basis of said management data.

14. A high-speed image signal processing system as set forth in claim 13, wherein:

said management data memory means has a first port connected to said code bus and a second port, independent of said management data memory means, connected to said system bus; and said code transfer means is responsive to management data applied from said management data memory means to said code bus to transfer said encoded signal from said memory means to said code bus.

15. A high-speed image signal processing system as set forth in claim 3, wherein said image bus means comprises:

a first image bus member connected to said input means and said encoding means; and a second image bus member connected to said decoding means and said output means.

* * * * *